US005493642A

United States Patent [19]
Dunsmuir et al.

[11] Patent Number: 5,493,642
[45] Date of Patent: Feb. 20, 1996

[54] GRAPHICALLY CONSTRUCTED CONTROL AND SCHEDULING SYSTEM

[75] Inventors: Martin R. M. Dunsmuir, Issaquah; Bruno Alabiso, Redmond, both of Wash.

[73] Assignee: Jocatek, Inc., Bellevue, Wash.

[21] Appl. No.: 233,529

[22] Filed: Apr. 26, 1994

[51] Int. Cl.$^6$ .................................................. G06F 17/00
[52] U.S. Cl. ........................... 395/161; 395/155; 395/159
[58] Field of Search ..................... 395/155, 157, 395/159, 160, 161; 246/5; 273/442, 437; 318/51; 364/424.07, 424.02, 426.01, 426.04, 426.05, 432, 436, 437, 438, 439, 440, 444

[56] References Cited

U.S. PATENT DOCUMENTS

| | | | |
|---|---|---|---|
| 3,794,833 | 2/1974 | Blazek et al. | 246/63 C |
| 4,041,283 | 8/1977 | Mosler | 235/150.2 |
| 4,341,982 | 7/1982 | Lahti et al. | 318/51 |
| 4,349,196 | 9/1982 | Smith, III et al. | 273/1 GC |
| 4,630,216 | 12/1986 | Tyler et al. | 364/478 |
| 4,766,547 | 8/1988 | Modery et al. | 364/478 |
| 4,817,948 | 4/1989 | Simorelli | 273/86 B |
| 4,853,883 | 8/1989 | Nickles et al. | 364/578 |
| 4,914,568 | 4/1990 | Kodosky et al. | 364/200 |
| 5,122,717 | 6/1992 | Hayashi | 318/569 |
| 5,122,959 | 6/1992 | Nathanson et al. | 364/436 |
| 5,168,441 | 12/1992 | Onerheim et al. | 364/146 |
| 5,168,451 | 12/1992 | Bolger | 364/436 |
| 5,236,156 | 8/1993 | Zimmerman | 246/5 |
| 5,340,062 | 8/1994 | Heggestad | 246/5 |

OTHER PUBLICATIONS

Ames, S., "Overview of NMRA Digital Command Control Standards," NMRA Bulletin, Oct. 1993, pp. 12–17.

*Primary Examiner*—Mark R. Powell
*Assistant Examiner*—Huynh Ba
*Attorney, Agent, or Firm*—Ronald M. Anderson

[57] ABSTRACT

A system and method for controlling a model train system and for defining a finite state machine for implementing control of the system. A computer (32) that is running a graphic user operating system is coupled through its serial port to a master control unit (MCU) (48). The MCU is coupled to slave control units (SCUs) (50, 52) and to a hand control unit (HCU)(152) through a token ring network (69) over which the computer transmits commands to energize selected track sections and to control the speed of locomotives (88, 90) running thereon. The MCU and SCUs are coupled to the sections of tracks and to electromagnetic switches (42, 44, 46) that determine the route of the trains over the sections of track. Furthermore, detector circuits (126) monitor a detector pulse to sense the presence of a locomotive or train on a particular section of track, producing an indicative output signal that is provided to the computer. The user graphically defines events, conditions, and control actions that are to be carried out on a visually displayed schedule manager grid. In addition, the user can graphically define a control panel that includes graphic controls, which can be manipulated by the user to establish the speed of a locomotive and to control the status of the electromagnetic switches. The control system can also be applied to control other systems that include electrically energized components.

17 Claims, 22 Drawing Sheets

GRAPHICALLY CONSTRUCTED CONTROL AND SCHEDULING SYSTEM

FIELD OF THE INVENTION

This invention generally pertains to a method and apparatus for controlling and scheduling the operation of a plurality of devices using a computer, and more specifically, for defining a control scheme for a plurality of devices, which in one preferred form of the invention is used for controlling and scheduling the operation of toy vehicles running on a track.

BACKGROUND OF THE INVENTION

In the traditional control paradigm, the occurrence of an event triggers a control action. The event may be, for example, a signal whose magnitude exceeds a predefined level, or the lapse of a predefined time interval. The control action can be almost anything that comprises an appropriate response to the event. For systems that include a very defined set of events and corresponding responses, a hardwired electromechanical control may be entirely adequate to accomplish the desired task. As the complexity of the controlled system increases, logic circuits offer a significant advantage over simple electromechanical controls.

However, if the system to be controlled is less well defined or is subject to frequent changes, a more generalized control is required that can easily be adapted to variations in the events, conditions, and control actions that will be applied to operating the system. In this case, a microprocessor-based control offers the advantage of being reprogrammable to provide different responses to different events and conditions. Unfortunately, the task of reprogramming is not easily accomplished by the typical person, since it generally requires the skills of a person who can program in assembly language. Even if a personal computer is used as a control device, the interface used to define the control scheme typically employs a high level language such as BASIC, with which only a small percentage of potential users is proficient. Furthermore, errors in the logic employed in setting up the control can creep in and remain undetected, with potentially harmful results.

The use of computers for controlling systems is well known, but in most cases, the control programs employed are not adapted to handle changing environments. There are numerous instances wherein a personal computer control would be very welcome, if provided with an interface that people without specialized programming skills could use. For example, personal computers have been used for controlling appliances, lighting, and security in residences. Since the required configuration and control requirement of a full home control can easily change with time, for example, as new appliances and circuits are added or existing elements are changed, it would be convenient if the user could readily adapt the control scheme to handle such changes without reprogramming the computer.

Computer controls are not limited to applications such as total home control. They can also be used in connection with hobbies, such as controlling toy vehicles running on a track. Many people invest considerable time and money in building and operating model train layouts. These layouts are often complex, including many separate track sections on which several trains run. Most often, the various trains running on a layout are manually controlled. Several people may be required to operate a complex system with several trains that are running to avoid collisions or overspeed on curves that can cause the locomotive or cars to leave the track.

People involved in such hobbies enjoy trying to emulate circumstances that can arise in the operation of full-size vehicles. For example, just as actual trains run on schedules and over the same roadway or tracks as other vehicles, hobbyists enjoy scheduling and controlling the operation of the scale-size replicas of these vehicles. Computer control of the toy vehicles provides an expedient method to schedule operation of the toy vehicles, just as it does their full-size counterparts. However, control applications that enable non-programmers to easily define schedules, events, conditions, and control actions in order to accommodate changing control requirements are not presently available.

An effective computer control for toy vehicles running on a track must have some feedback signal that provides information on the results of a control action. The same requirement applies to the control of other types of systems in which devices are controlled. If two model trains at times share the same track layout, the control must be provided with a signal that denotes the location of each train and must use the signal to prevent a collision and possible derailment of the trains.

U.S. Pat. No. 4,349,196 discloses a computer controlled toy track system in which an electro-optical sensing device disposed under the track or roadway senses the passage and identity of individual cars and produces a corresponding signal that is input to a microprocessor-based operator control panel. To identify specific cars, a strip bearing an appropriate bar code is attached underneath the cars, where it can be scanned by the electro-optical sensing devices that are placed at predefined locations in the layout. The control panel employed in this system is not that of a personal computer, but instead, simply includes a keypad, a plurality of light emitting diodes, and a one row alphanumeric display. This system does not readily allow adaptation of the control to changing circumstances and configurations. More importantly, its use requires that an existing system be retrofitted with the electro-optical sensors, which can be somewhat difficult to install and connect to the control panel.

Another aspect involved in the control of toy vehicles running on a track relates to the way in which the speed of the vehicles is controlled. Low voltage alternating current (AC) can be applied to the tracks to provide power for the motors in the vehicles, but most model train engines are powered by direct current (DC) motors. The speed of these motors is typically controlled by varying the voltage and polarity of the DC. Another method involves supplying the motors with a pulse width modulated (PWM) DC signal. The pulse width of this signal is adjusted to achieve a desired speed for the train running on a specific track section to which the signal is applied.

To independently control the motors in different locomotives supplied with power through the tracks, two approaches have been used. As disclosed in U.S. Pat. No. 4,341,982, a plurality of actuators generate a plurality of variably modulated selected frequencies that are superimposed on the DC power signal applied to the track. Receivers in the locomotives of each different train running on the layout are each tuned to a different selected modulated frequency. The variable modulation signal is used by the receiver tuned to it to determine the motor speed of the locomotive in which the receiver is disposed.

Another approach uses pulse position modulation to control the motor on a specific engine. However, the circuitry required for this method is relative expensive. Both of these prior art techniques for controlling specific engines on a track layout require that each engine be modified to carry the circuitry needed to discriminate between the signals supplied on the track in order to respond only to an intended speed control signal. It would clearly be preferable to avoid modifying the engines in this manner and to simply directly couple the locomotive motor to the DC power provided through the track on which the locomotive is running.

SUMMARY OF THE INVENTION

In accordance with the present invention, a method for defining a finite state machine to control a system includes the initial step of providing a graphic environment running on a computer, under which a control application is run. While running the control application on the computer, a schedule manager grid that comprises the finite state machine is graphically developed or defined by the user. The user selects symbols from among a plurality of different symbols representing corresponding different possible events and associates the selected symbols with other symbols selected from among a plurality of different symbols representing possible control actions for the system. At least some of the different symbols represent events that can occur external to the computer. Such external events are indicated by signals that are input to the computer from the system being controlled. The selected symbols used to graphically define the schedule manager grid identify a desired control action that should occur when an event associated with the desired control action occurs. Accordingly, a control signal that effects the desired control action on the system when the event associated with said desired control action occurs is produced by the computer.

The plurality of different symbols from which symbols are selected also includes symbols representing different conditions that can be satisfied on the system. Preferably, when developing the schedule manager grid, the user also graphically selects a symbol that represents a desired condition and associates that selected symbol with the selected symbols representing the event and the desired control action. The step of producing the control signal then only occurs if the desired condition is also met.

At least some of the plurality of different symbols preferably represent events that occur internally within the computer. The method further comprises the step of including a variable with at least one of the selected symbols representing the event, the desired condition, and the desired control action in developing the schedule manager grid. The schedule manager grid also preferably includes a plurality of lines of selected symbols. Each line of selected symbols corresponds to a state of the system in which is graphically indicated one of a plurality of desired control actions that should occur when one of a plurality of events occurs. The selected symbols respectively represent the desired control actions and the associated selected events.

Another aspect of the present invention is a system for controlling toy vehicles running on a track. This system includes a computer having a display screen, a central processing unit (CPU), an operator interface, a memory, and at least one port coupled to the CPU for input and output of electrical signals. The CPU responds to electrical signals input to the computer through the port in accordance with a state machine that is graphically defined by an operator on the display screen using the operator interface. The computer produces control signals that are conveyed through the port to control the toy vehicles. A power supply produces electrical power suitable to energize the toy vehicles. The power supply is coupled to a switching network that is controlled by the CPU in accord with the state machine defined by the operator. The system also includes a track that is divided into a plurality of sections. Each section of track is separately electrically coupled to the power supply through the switching network so that each section is independently energized by the switching network under control of the CPU. A plurality of toy vehicle detector circuits are included, each of which is associated with a different one of the plurality of track sections. These detector circuits each monitor a detector signal on a different one of the plurality of track sections. The presence of a toy vehicle on one of the plurality of track sections modifies the detection signal, which is produced by the switching network, causing the detector circuit monitoring that track section to produce an output signal indicating the presence of the toy vehicle on the track section.

Program instructions stored in the memory of the computer enable the user to graphically define the state machine to control the plurality of toy vehicles on the track. For at least one of the toy vehicles, the state machine graphically identifies an event selected by the user and at least one control action selected by the operator for association with the event. The event at times comprises an arrival of one of the toy vehicles on a selected section of track, as indicated by the change in the detection signal produced by the toy vehicle detection circuit associated with that section of track. At other times, the control action comprises the CPU producing a control signal that causes the switching network to energize a selected section of track when the event has occurred.

The program instructions enable the user to graphically define a condition that is associated with the event. The CPU does not produce the control signal to effect the control action associated with the event until the condition(s) are satisfied.

Preferably, the switching network comprises a master control unit (MCU) that includes a plurality of motor control circuits. Each motor control circuit enables application of an electrical current produced by the power supply to a specific section of the track in order to energize one of the toy vehicles that arrives on that section of track. The track includes at least one electromagnetic switch that controls routing of a toy vehicle running over the electromagnetic switch, thereby controlling the track sections over which the toy vehicle runs. The MCU selectively energizes the electromagnetic switch in response to control signals from the computer. In addition, the switching network can comprise at least one slave control unit (SCU). The SCU also includes a plurality of motor control circuits, each of which enables application of an electrical current produced by the power supply to a specific section of the track in order to energize one of the toy vehicles that arrives on that section of track. The MCU and each SCU further comprise synchronization means for ensuring that the motor control circuits, which control electrical current to adjacent sections of track, are synchronized to ensure that the electrical current on one track section is in phase with that on the adjacent track sections while a toy vehicle crosses a boundary between the adjacent track sections. This synchronization prevents inadvertent speed changes by the vehicle when it crosses a boundary.

The switching network includes means for applying a detector pulse to a section of track, and the toy vehicle detection circuits respond to a magnitude of the detector pulse on one of the tracks comprising the section of track to detect a toy vehicle on the section of track. The pulse is conducted to the track section from the other track through any toy vehicle that is disposed on the section of track monitored by one of the toy vehicle detection circuits. When the toy vehicle is not present on the track section, there is no conduction between the tracks, and the pulse is not present on the track that is monitored. Periodically, the switching network applies the detector pulse to the section of the track when the switching network is not enabling the electrical current to energize the toy vehicle. In one preferred form of the invention, the switching network provides a PWM electrical current to energize the toy vehicle and controls the speed of the toy vehicle by controlling the width of pulses comprising the electrical current, in response to control signals provided by the computer.

The program instructions executing in the computer enable the user to graphically define the state machine by first selecting an event symbol from a plurality of predefined event symbols, each of which represents a different event that might occur. The user also may select a condition symbol from a plurality of predefined condition symbols, each of which represents a different condition that must be satisfied. Finally, the user selects an action symbol from a plurality of predefined action symbols, each of which represents a different control action that can be implemented. In response to an event occurring represented by the event symbol selected by the user and a condition represented by the condition symbol selected by the operator being met, the program instructions cause the control action represented by the action symbol to be implemented.

The plurality of condition symbols include a symbol indicating whether a specific toy vehicle owns a section of track. A toy vehicle owns the section of track if the toy vehicle can control that section of track without interference from other toy vehicles, thereby ensuring that only one toy vehicle occupies that section of track at one time.

The CPU preferably includes a timer. If so, the plurality of event symbols include an event symbol that responds to expiration of a time interval on the timer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

General Overview

Figure 1:
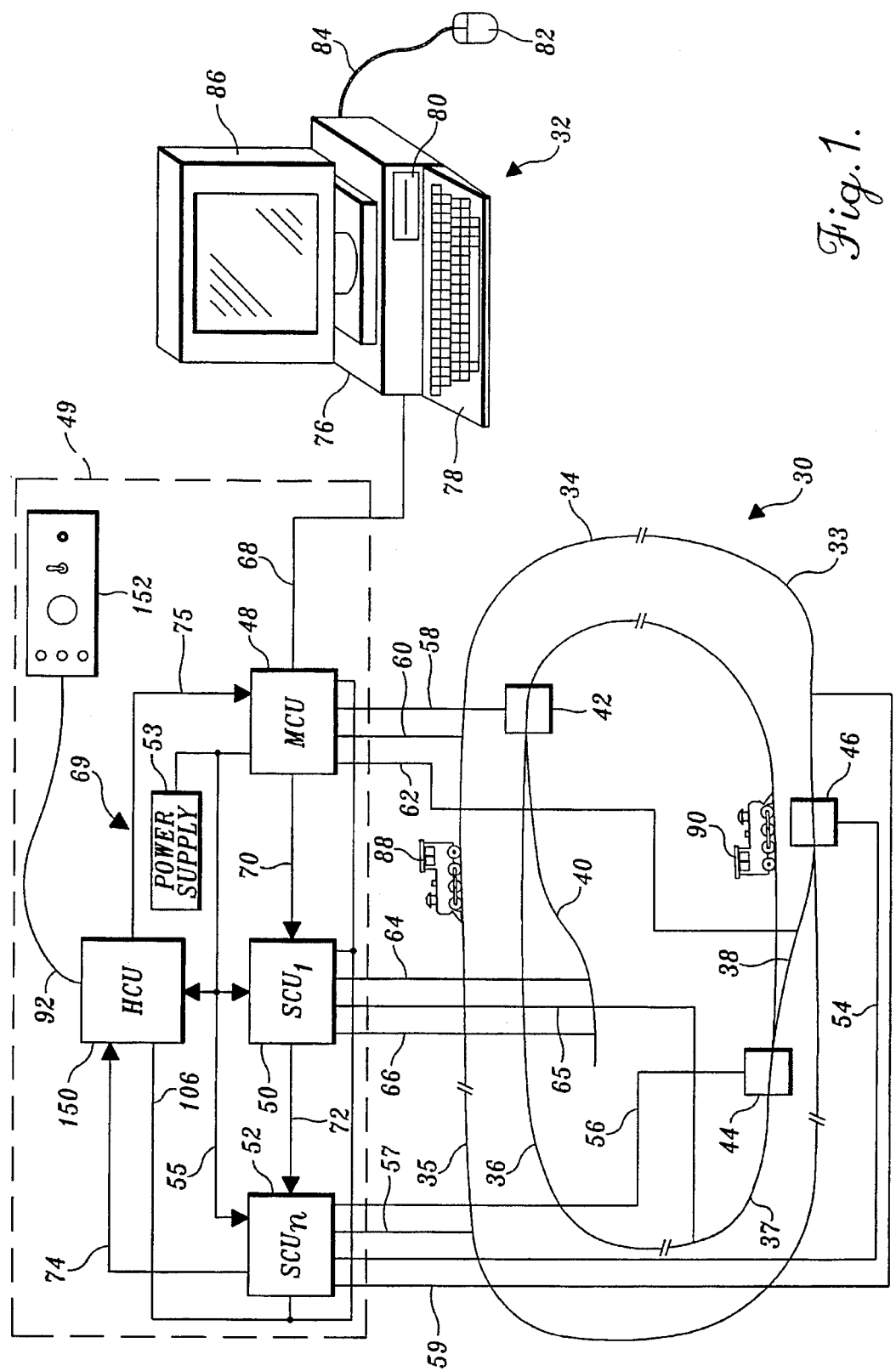
FIG. 1 is a schematic block diagram showing a model railroad track layout and locomotives that are controlled by the present invention using a computer and a hardware interface to the track layout.

In FIG. 1, an exemplary track layout 30 illustrates how the present invention is applied in a particular control application. While certain aspects of the present invention are intended for the control of toy vehicles on a track, or more specifically, control of model trains, it will be appreciated that many other types of systems can be controlled with the present invention. Software comprising a set of program instructions runs on a computer 32 under a graphic user interface. These program instructions instruct the computer to control devices comprising a system based upon a finite state machine that is visually and graphically defined by the user. The finite state machine serves to establish a list of rules by which the devices comprising the system are controlled in accordance with the program instructions. Thus, the program instructions enable a user to define state vectors for the devices and then automatically control the devices as specified by the state vectors. Optionally, the user can also manually control the system by manipulating visual graphic representations of controls that cause a corresponding control action to be applied to the devices in the system. In the preferred embodiment, computer 32 runs the control software under the Microsoft® WINDOWS™ graphics user interface; however, it is contemplated that the control software can readily be adapted to run on other operating systems and other types of computers.

Description of Track Layout and Hardware

Track layout 30 is intentionally relatively simple in design, for purposes of more clearly illustrating a specific application of the present invention, The track layout includes outer track sections 33, 34, and 35 and inner track sections 36 and 37. A crossover track section 38 couples inner track section 37 to outer track section 33. Crossover track section 38 is coupled to inner track section 36 through an electromagnetic (track) switch 44 and to outer track section 34 through an electromagnetic switch 46, enabling the software or the user to selectively route the locomotives 88 or 90 so that they cross between the inner and outer track sections. A siding track section 40 is also provided inside of the inner track section, and is coupled to inner track section 36 through an electromagnetic switch 42. When electromagnetic switches 42, 44, or 46 are electrically actuated, they cause locomotives 88 or 90 to travel onto siding track section 40 from inner track section 36, or onto crossover track section 38 from the inner track section or the outer track section, as the case may be.

Power in the form of PWM DC is separately selectively applied to external track sections 33, 34, and 35, internal track sections 36 and 37, crossover track section 38, and siding track section 40, to selectively energize electrical motors (not shown) in locomotives 88 and 90 when they are on one of those specific sections of track. The track sections are electrically isolated from each other at the points indicated in FIG. 1 by the double hash marks crossing the track layout. Those who operate model trains will appreciate that the pair of rails or tracks (not separately shown) comprising each track section convey electrical current to the locomotive motors by conduction through the wheels and split axles. In addition to supplying power to the locomotives, the track sections each are periodically energized with detection pulses that are applied to one of the two tracks in each track section. Conduction of the detection pulses through the locomotive motors enables the detection pulse to appear on the other track. The presence of the detection pulse on the other track is used to sense the presence of a locomotive on any of the various track sections. Data indicating the location of locomotives 88 and 90 on specific track sections is provided to computer 32 for use in controlling the locomotives.

To interface computer 32 to track layout 30 and to implement control and scheduling of locomotives 88 and 90, a switching network 49 is provided. The switching network selectively enables the flow of electrical current to energize specific selected track sections and actuate specific selected electromagnetic switches, and determines the location of the locomotives on specific track sections. In the preferred form of the invention, switching network 49 includes at least one MCU 48 and may optionally include one or more SCUs 50, 52 and one (or more) HCUs 150. The SCUs allow additional track sections and electromagnetic switches to be controlled, beyond the capacity of MCU 48, but are not be required in controlling track layouts that have less than eight track sections and less than 16 electromagnetic switch circuits. HCU 150 allows manual control (as opposed to directly manipulating the graphic user interface on computer 32) of the locomotives and electromagnetic switches by one or more users, as will be explained below, and is therefore also not required for every installation. In the following discussion, the generic term "control units" is used in referring collectively to MCU 48, SCUs 50 and 52, and HCU 150 or when there is no reason to distinguish between these devices.

A power supply 53 of generally conventional design provides DC to the MCU and to the SCUs and HCU 150 through lines 55, at appropriate voltage levels and current capacity for energizing these devices and as appropriate to provide the power needed to control and operate the locomotives and electromagnetic switches comprising track layout 30. The SCUs and HCU are linked with MCU 48 in a token ring network 69 through conductors 70, 72, 74, and 75. An RS-232 serial port (not separately shown) on computer 32 is coupled to MCU 48 through a line 68 and conveys commands from the computer to token ring network 69 and data from the token ring network to the computer—all passing through MCU 48.

In the preferred embodiment, MCU 48 and SCUs 50, 52 are each able to control PWM current to eight different track sections and to sense locomotives on the eight track sections. In addition, MCU 48 and each of the SCUs can control a plurality of electromagnetic switches. Since it was intended that FIG. 1 not be overly complicated, fewer than the maximum number of track sections and electromagnetic switches that can be controlled by each are shown coupled to MCU 48 and SCUs 50 and 52. It will be understood that additional SCUs can be added to the token ring network to further expand the number of track sections and electromagnetic switches that can be controlled thereby, so that an extremely complex model railroad layout (or other toy vehicle system) can readily be controlled, in comparison to relatively simple track layout 30. To emphasize that additional SCUs, up to some arbitrary number "n," can be added, SCU 50 is labeled "SCU$_1$" and SCU 52 is labeled "SCU$_n$," in FIG. 1.

In the preferred embodiment, MCU 48 is coupled to electromagnetic switch 42 through a line 58 and controls the switch by selectively supplying the DC needed to actuate it so that it changes state, i.e., moves from one position to another. In addition, the MCU enables power to be supplied to external track section 34 and to crossover track section 38 through lines 60 and 62, respectively, where each such line comprises a pair of conductors, each of which is separately coupled to one of the two parallel tracks comprising each section of track. Detection signals also supplied through these same lines are used to detect the presence of one of the locomotives on these track sections, as explained below. SCU 50 enables power to be supplied to and detects the presence of locomotives on siding track section 40 and inner track sections 36 and 37 through lines 64, 65, and 66, respectively. Likewise, SCU 52 is coupled to electromagnetic switches 44 and 46 through lines 56 and 54, respectively, for controlling their operation, and enables power to be supplied to and detects the presence of locomotives on outer track sections 33 and 35. HCU 150 is not directly coupled to any track section, but instead generates control signals to which computer 32 responds; the computer issues corresponding commands to the MCU and SCUs that cause power to be enabled to the track sections on which a particular locomotive is disposed in accordance with the control signals produced by the HCU.

Although the software running on computer 32 enables an operator to schedule the operation of locomotives 88 and 90 running on track layout 30 in an automated fashion, based upon timed events and other established conditions corresponding to state vectors comprising the finite state machine defined by the user, the system also permits manual control of the speed, braking, and direction in which the locomotives travel in response to the user manipulating a hand controller 152. Hand controller 152 is coupled through a line 92 to HCU 150. Although the preferred embodiment illustrates only a single hand controller, it will be apparent that HCU 150 can be coupled to a plurality of hand controllers (up to eight in the preferred embodiment), enabling a corresponding plurality of different users to each control a different locomotive running on the track layout. It is important to note that HCU 150 is not hardware coupled to any specific track sections. Instead, each hand controller 152 is dynamically configured by the user to control a specific locomotive by passing commands from computer 32 to the MCU and SCUs, so that the locomotive assigned to the hand controller is controlled regardless of the track sections on which the locomotive is running.

Computer 32 in the preferred embodiment is generally conventional, including a CPU 76 (represented by the computer console), and a keyboard 78. A floppy disk 80 is included for initial input of the software program files, which are run as a WINDOWS™ application on CPU 76. In response to the machine instructions comprising the software program files, computer 32 provides display screens that accept user input to define a schedule and operate the locomotives and track layout in accordance with the user input. Computer 32 also includes a display monitor 86, and a hard drive (not separately shown), which is used to more permanently store the software program files and to store other files created while running the software program. In addition to handling input through keyboard 78, the user interface employs a mouse 82. The mouse is coupled to CPU 76 through a line 84, which is connected to one of the RS-232 serial ports on the computer or to a separate bus interface (not shown), as is conventional. A user can move the mouse, causing a cursor to move in corresponding fashion on the display monitor screen, and using the mouse buttons, can select items on the display monitor and move them about, as is generally conventional in other graphic user interface application programs. Although computer 32 is illustrated as a desktop unit, it will be appreciated that a relatively smaller notebook size computer can also be used.

Figure 2:
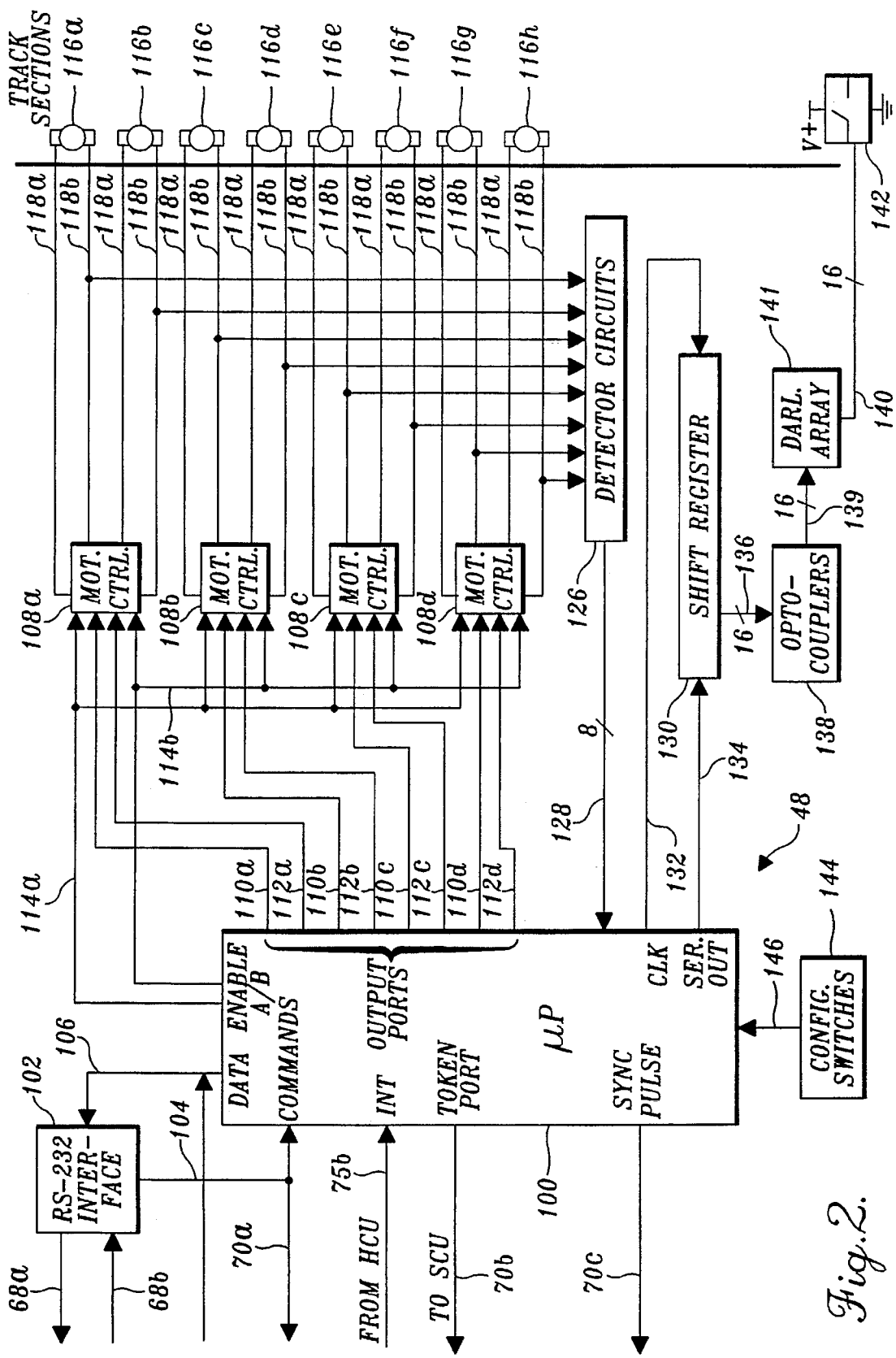
FIG. 2 is a schematic electrical diagram of an MCU that is used to control a plurality of track sections and/or other electrical devices.

Turning now to FIG. 2, details of MCU 48 are shown in a block diagram. An RS-232 interface circuit 102 is connected to the RS-232 serial port on the computer through a transmit line 68a and a receive line 68b. RS-232 interface circuit 102 is in turn coupled to a microprocessor 100 through a line 104, which provides input of commands to the microprocessor from computer 32; in addition, line 104 is coupled to a line 70a through which commands are passed on to each of the other control units on token ring network 69. Data from microprocessor 100 and from the other control units on token ring network 69 are supplied through a line 106 to RS-232 interface circuit 102 and thus, to computer 32. During startup of the control system, computer 32 first configures MCU 48 and then each of the other control units, one at a time, assigning each a unique address. The MCU initially takes ownership of a token that determines which control unit controls the token ring network, and after the MCU has been configured, passes the token to the next control unit on the token ring network. Since only the control unit currently in possession of the token can respond to commands during startup, addresses are assigned in an orderly fashion to each control unit on the token ring network in succession. Once an address is assigned to one of the control units, only that control unit responds to commands from computer 32 that are directed to that address, i.e., after this configuration process has been completed during startup, the respective control units each only respond to commands directed to their assigned address. Since line 106 is shared by MCU 48 and each of the other SCUs and HCUs in the system to pass data back to the computer, it can only be used by the device that currently has the token. The token is passed from MCU 48 to SCU 50 when microprocessor 100 briefly drops the normally high token port signal conveyed on a line 70b to a low level, i.e., produces a negative pulse. The token is passed in this manner around all of the control units and thus, returns to MCU 48 from HCU 150 on a line 75b, which is coupled to an interrupt port of microprocessor 100.

Firmware embedded in microprocessor 100 of MCU 48 is used to control the MCU. For example, microprocessor 100 generates a sync pulse that synchronizes all of the SCUs and HCUs on the token ring network, and this sync pulse is conveyed on a line 70c to all of the control units. The sync pulse determines when all of the devices enable detector pulses for detecting the presence of a locomotive on a specific track section and ensures that motor control pulses (explained below) on adjacent track sections are in sync with each other so that as a train crosses a boundary between two track sections controlled by different SCUs, the train does not exhibit a short surge of speed, by ensuring that the PWM drive signals applied to adjacent sections of track are in phase. In the preferred embodiment, the synchronization pulse frequency is about 120 Hz.

A plurality of pairs of lines 110 and 112 couple output ports on microprocessor 100 with a corresponding plurality of motor control circuits 108. Specifically, lines 110a and 112a are coupled to a motor control circuit 108a, lines 110b and 112b are coupled to a motor control circuit 108b, etc. In addition, two enable lines 114a and 114b are coupled to each motor control circuit 108 from microprocessor 100 in MCU 48. Either a logic level 1 or logic level 0 can appear on the enable lines, but a logic level 1 on both enable lines is required to enable output current to a given track section (or other type of load) controlled by MCU 48 from motor controls 108 supplied over lines 118a and 118b. If both lines 114a and 114b convey a logic level of 0, no current flows in lines 118a and 118b, and the output impedance between the lines is high to prevent shorting of the detection pulse when the PWM driving current signal is not being applied. The polarity of the output current conveyed to track sections 116a through 116h from motor controls 108 depends upon the logic levels on pairs of lines 110 and 112. When line 110 is high and line 112 is low, current flows in one direction through lines 118a and 118b, and when line 110 is low and line 112 is high, it flows in the opposite direction.

In addition to conveying current to energize track sections 116 (or other loads attached thereto), lines 118a convey a detector pulse to each of track sections 116a through 116h.

If a load is coupled to lines 118a and 118b on a given track section, e.g., if one of the locomotives is present on the track section, the detector pulse is conducted through the load and into line 118b for that track section. Lines 118b are coupled to detector circuits 126, which in turn, are coupled through lines 128 to input ports of microprocessor 100. Thus, microprocessor 100 in MCU 48 is able to sense the presence of a train on a particular track section, based upon presence of the detector pulse on line 118b that is coupled to that track section. Further details of detector circuits 126 are described below.

Table 1, which follows below, summarizes the relationship between the logic levels on lines 110, 114, and 112 and the effect on each motor control 108.

TABLE 1

| CONDITION OF MOTOR | LOGIC LEVELS PRESENT ON LINES | | | | OUTPUT LEVEL | |
|---|---|---|---|---|---|---|
| CONTROL | 110 | 112 | 114a | 114b | 118a | 118b |
| Forward | 1 | 0 | 1 | 1 | H | L |
| Reverse | 0 | 1 | 1 | 1 | L | H |
| Detection | 1 | X | 1 | 0 | PULSE | HI-Z |

In the above table, "X" represents a logic level that can be either 0 or 1, H is the higher voltage side of the drive signal, L is the lower voltage side, "PULSE" represents the detection pulse, and "HI-Z" is the impedance on the terminal of the motor control coupled to line 118b while the detection pulse is output on line 118a. This high impedance on the terminal of the motor control prevents the detection pulse that is conducted through a vehicle setting on the tracks from being shorted to ground within the motor control, thereby enabling the pulse on line 118b to be sensed and the locomotive on the track to be detected.

To control the electromagnetic switches, such as electromagnetic switches 142a and 142b, a serial output port on microprocessor 100 is coupled through a line 134 to a shift register 130. Shift register 130 is clocked by a clock signal provided by the microprocessor through a line 132. Shift register 130 is a serial-in, parallel-out shift register that is loaded serially by the microprocessor each time that any electromagnetic switch controlled by the MCU is required to change state, e.g., to move right or left. The shift register produces enable signals that are input in parallel via lines 136 to opto-couplers 138. Lines 139 convey the optically isolated signals to Darlington arrays 141. In response to these enable signals, the Darlington arrays produce a signal that changes the state of one or more of electromagnetic switches 142. These signals are conveyed to electromagnetic switches 142 lines 140. Although only one electromagnetic switch 142 is shown, it will be understood that up to 16 such switches can be controlled by MCU 48.

An array of configuration switches 144 are coupled to microprocessor 100 through lines 146. These configuration switches are digi-switches that are used to assert logic levels on input ports of the microprocessor to determine, for example, whether microprocessor 100 is the microprocessor in MCU 48, or alternatively, in one of the SCUs, and to indicate whether the switching network includes any SCUs or HCUs, so that the token ring network functions should be enabled. Other functions of microprocessor 100 can also be selectively controlled by appropriately setting configuration switches 144.

Figure 3:
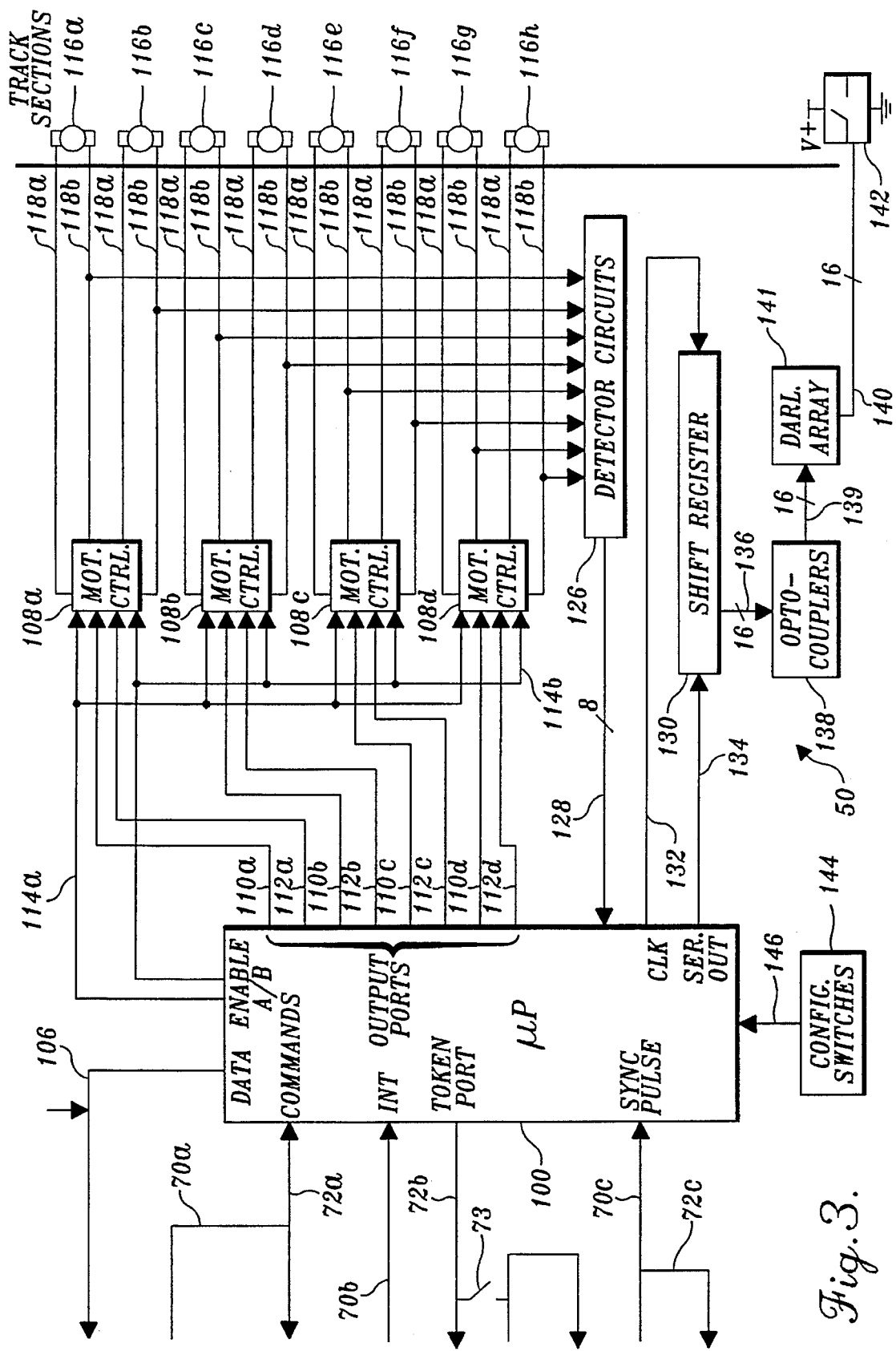
FIG. 3 is a schematic electrical diagram of an exemplary SCU that is coupled to the MCU of FIG. 2 and used to control additional track sections and/or other electrical devices on the track layout.

In FIG. 3, a schematic block diagram for SCU 50 is illustrated, which is exemplary of the configuration of each of the SCUs used in the control system of the present invention. Since SCU 50 and each of the other SCUs include virtually the same components as MCU 48, the same reference numerals have been used to identify the elements of SCU 50 that are in common with those of MCU 48. The only significant differences between the configuration of the MCU and that of the SCUs arise in the setting of configuration switches 144, as noted above, and with regard to connecting its microprocessor 100 into the token ring network. Line 70a conveys commands to microprocessor 100 of SCU 50, and a line 72a conveys these commands onto the next SCU in the token ring network. Line 70b carries an interrupt signal that was produced by MCU to pass the token to SCU 50. When SCU 50 passes the token to the next control unit in the token ring network, it generates a short negative pulse on its token port, which is coupled to a line 72b. The sync pulse from MCU 48 is input on a line 70c and conveyed to the next SCU through a line 72c. In all other respects, the components of each of the SCUs operate as described above.

Figure 3A:
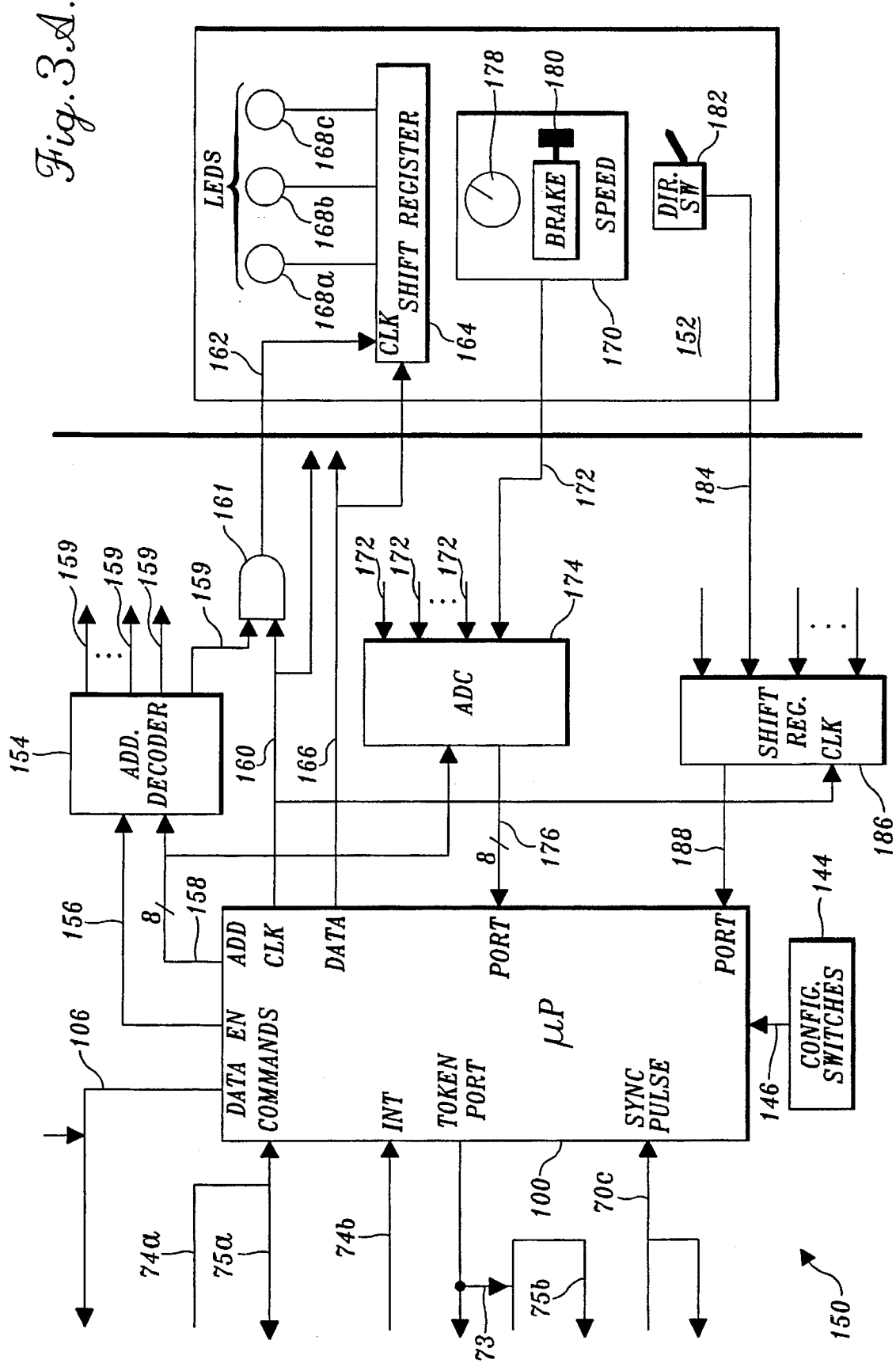
FIG. 3A is a schematic electrical diagram of a hand control unit (HCU) and a hand controller that enable manual control of a locomotive's speed and direction.

Details of HCU 150 are shown in FIG. 3A. When HCU 150 has the token, data are output from microprocessor 100 in the HCU over line 106, which is also coupled to the data lines of the other SCUs and MCU. In addition, commands are conveyed from the computer to the microprocessor in the HCU from the preceding control unit over a line 74a, and onto MCU 48 (in the preferred embodiment) over a line 75a. An interrupt is received via a line 74b from the preceding SCU in the token ring network to pass the token to the HCU, and HCU 150 passes the token to MCU 48 by producing a short negative going pulse on the token port of its microprocessor. The token port on microprocessor 100 of the HCU is coupled to a jumper 73 into a line 75b back to the interrupt port of MCU 48. Sync pulses generated by the MCU are input to microprocessor 100 over line 70c, and would be conveyed to the next control unit in the token ring network if any were provided.

An enable port on microprocessor 100 of HCU 150 is coupled through a line 156 to an address decoder 154. Address decoder 154 can selectively address one of eight possible hand controllers 152, only one of which is shown in FIG. 3A. Addresses output on lines 158 determine which of the hand controllers are selected to provide input control data to HCU 150 or to receive data from the HCU at any given time. The output lines of address decoder 154 are each connected to a different AND gate 161 (only one shown) through lines 159. The other input to each AND gate 161 is a clock signal produced by microprocessor 100 that is conveyed on a line 160. The output of AND gate 161 is conveyed through a line 162 to a clock input on a shift register 164 in hand controller 152. Serial data output from microprocessor 100 in HCU 150 are conveyed on a line 166 to shift register 164 in each of the hand controllers. The shift register converts the serial data into corresponding parallel data for output to light emitting diodes (LEDs) 168a, 168b, and 168c, which are respectively red, green, and yellow in color. The color of the LED that is lighted provides the user with a feedback indication from the control system that shows the status of the train being controlled. When the next section of track is occupied by another train, the red LED is lighted; the green LED indicates that the train is free to move onto the next section of track; and, the yellow LED is lighted if the section of track just beyond the next section is occupied by another train. The status of each of these LEDs is determined by one-bit output from shift register 164, based upon data input from microprocessor 100 in HCU 150. The enable signal input on line 156 to address decoder 154 determines whether the clock signal is applied to shift register 164 to reset the state of LEDs 168.

The clock signal on line 160 is also coupled to the clock input of a parallel-in, serial-out shift register 186. Each of the eight parallel inputs to shift register 186 comprises a bit from a direction switch 182 in one of the hand controllers. In response to the clocking signal input to shift register 186, a serial data stream is produced on the output of the shift register, which is coupled to an input port of the microprocessor in the hand controller through a line 188. This serial data stream comprises bits that indicate the status of the direction switches in each of the hand controllers. Direction switch 182 simply provides a logic level 1 or 0 in each hand controller to indicate the direction selected, which is input to microprocessor 100 in HCU 150.

Addresses are also provided over lines 158 to an analog-to-digital converter (ADC) 174, having eight analog inputs, each of which is coupled by lines 172 to a speed control 170 in a different hand controller. In response to the address input to ADC 174, one of the hand controllers is selected for processing, i.e., the analog voltage developed by the speed control in a selected hand controller is converted to a corresponding digital value, which is input to a port of microprocessor 100 in HCU 150 over lines 176.

Figure 3B:
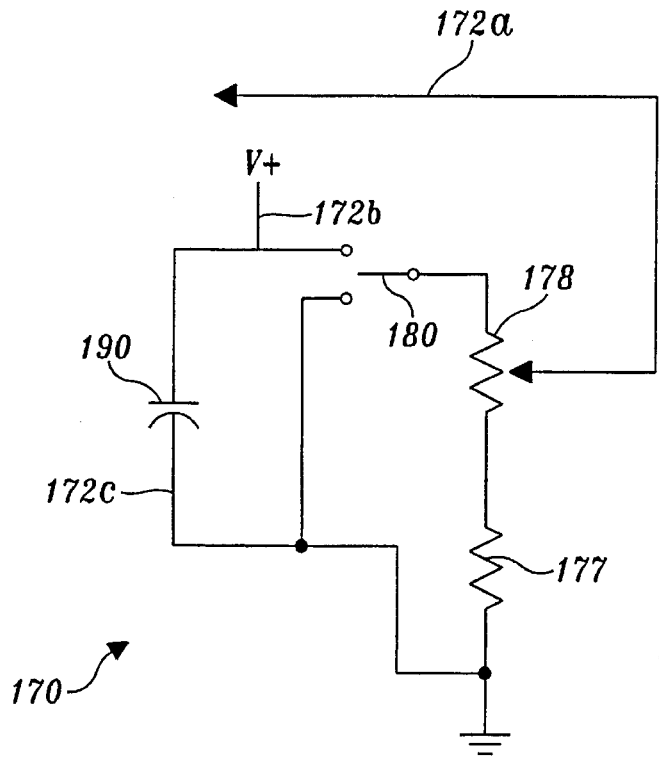
FIG. 3B is a schematic electrical diagram of the hand controller.

A schematic circuit for speed control 170 is shown in FIG. 3B. Speed control 170 includes both a throttle control 178 and a brake switch 180. In the speed control, a line 172b is coupled to one terminal of brake switch 180, which is a single-pole, double-throw type switch, and is also coupled to one side of a capacitor 190, the opposite side of which is coupled to ground through a line 172c. Capacitor 190 suppresses transients when brake switch 180 is operated. When brake switch 180 is not depressed, the switch toggle is coupled to the V$^+$ supply voltage. The toggle terminal on brake switch 180 connects to one end of a variable potentiometer (throttle control 178), and the other end of the variable potentiometer is coupled to one end of a resistor 177. The other end of the resistor is connected to circuit ground through line 172c. An analog voltage developed by setting the wiper of throttle control 178 is input to ADC 174. Resistor 177 serves to provide a minimum (non-zero) analog voltage on line 172a, when throttle control 178 is at its minimum resistance position, thereby enabling microprocessor 100 in HCU 150 to distinguish between a minimum throttle setting, which corresponds to the voltage developed across resistor 177 and the zero analog voltage that results when brake switch 180 is toggled to the ground terminal on line 172c.

Figure 4:
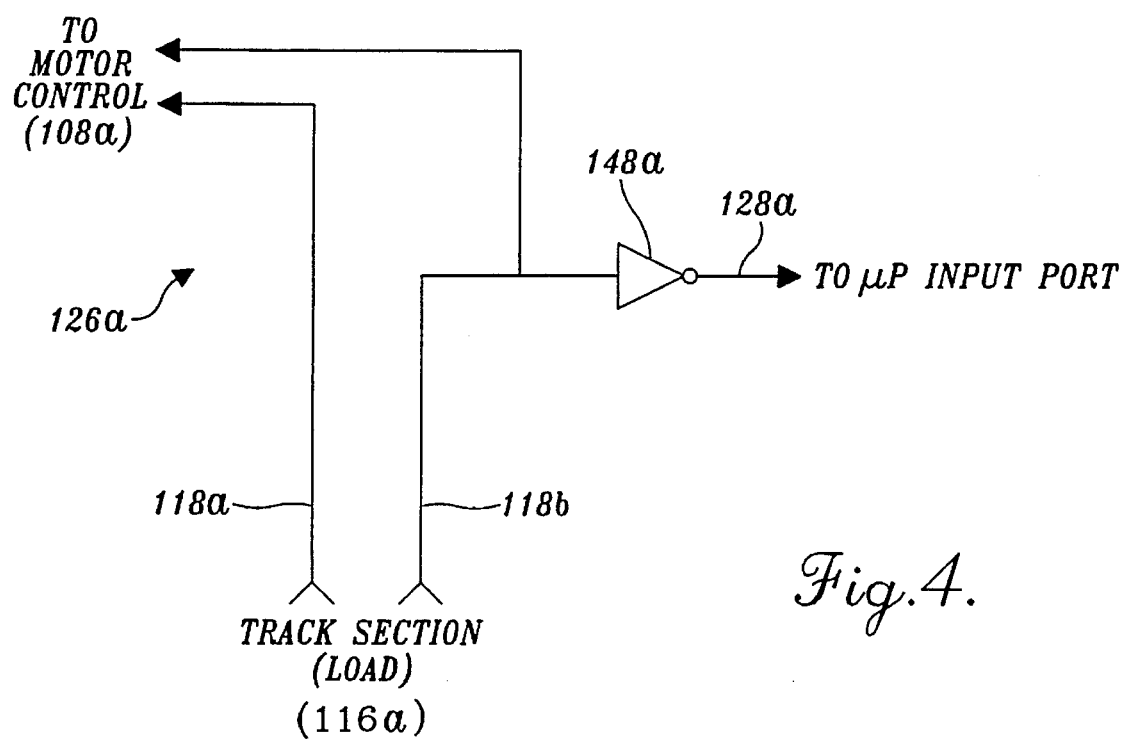
FIG. 4 is a schematic diagram of a track detection circuit used to determine whether a train is on a specific section of track.

MCU 48 and each of the SCUs include detector circuits 126. Details of the detector circuit for a single track section or other load imposed on one of motor controls 108 are shown in FIG. 4. It will be understood that each track section is coupled to a corresponding detection circuit like detection circuit 126a. Detection circuit 126a includes an inverter 148a having an input that is connected to line 118b; the output of inverter 148a is conveyed through a line 128a to the microprocessor input port. Line 118a extends directly from motor control 108a to track section 116a. When motor control 108a produces a detector pulse on line 118a, any load such as the electric motor of one of the locomotives, which is electrically connected between lines 118a and 118b (i.e., between the rails of track section 116a to which these lines are coupled), will conduct the detector pulse from the track connected to line 118a to the other track that is connected to line 118b. The detector pulse only appears on line 118b when a load is present on the track section to which the specific lines 118 are connected. Inverter 148a inverts the logic level of the detector pulse on line 118b, producing a corresponding inverted logic level on line 128a that is input to the microprocessor of the MCU or SCU. If no locomotive is present on track section 116a, the detector pulse does not appear on line 118b. The detector pulse on line 118b inverted to a logic level 0 indicates to microprocessor 100 in the MCU or SCU that a train or locomotive is present on track section 116a. Conversely, if a locomotive is not present, the 0 logic level on line 118b is inverted to a logic level 1. The high impedance of the motor control terminal connected to line 118b during the time that the detection pulse is generated prevents the pulse from being shorted to ground. The detector circuits coupled to each of the other track sections being monitored by the MCU or SCU operate in an identical manner.

Figure 5:
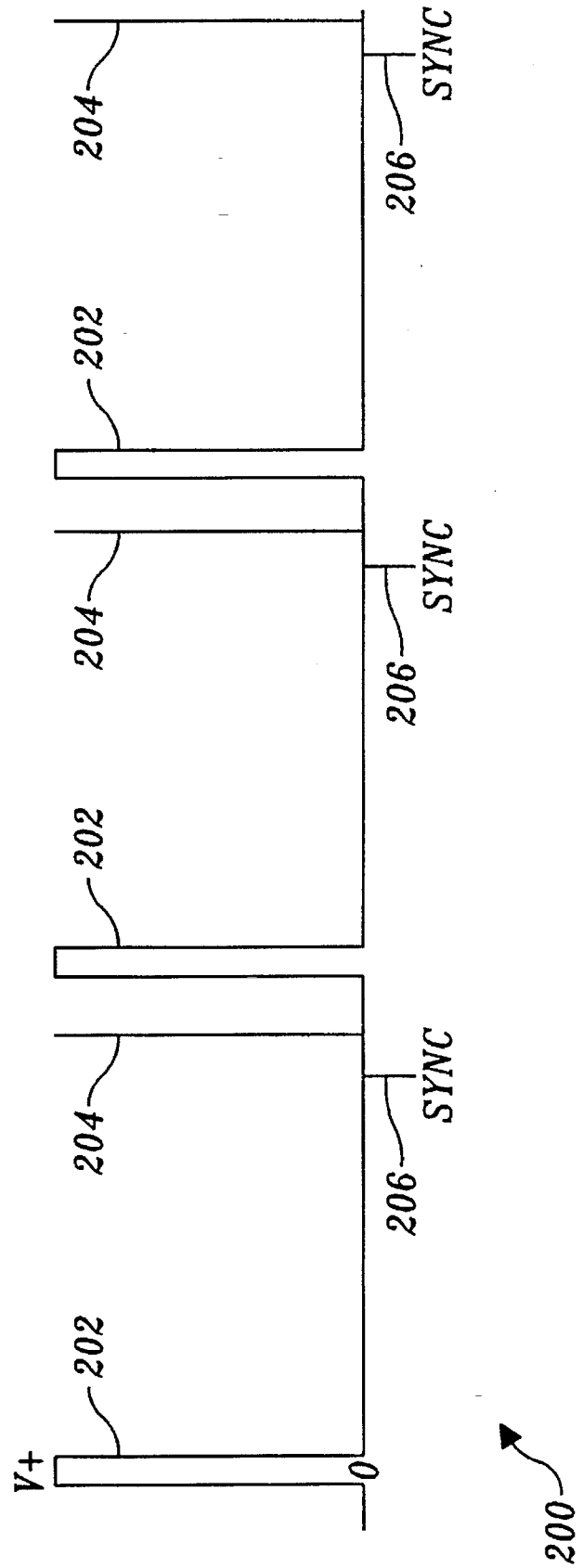
FIG. 5 is a graph showing a low-speed forward direction PWM drive signal interleaved with a detection signal used to determine that a train is on a specific section of track.

In order to better understand how the detector pulse is integrated with the drive pulses that energize an electric motor in one of the locomotives on the same lines 118, it is helpful to refer to FIG. 5. MCU 48 and each of the SCUs comprising the switching network are programmed to produce driving pulses 202 having a rising edge occurring a predefined time interval after each synchronization pulse 206. This time interval allows a detector pulse 204 to be produced between successive driving pulses 202. Each time that synchronization pulse 206 is received by microprocessor 100 in the SCUs (generated by the microprocessor in the MCU), it causes the microprocessor to disable the logic level on lines 110 for each of the motor control circuits 108, to produce detector pulses 204 on lines 118a, and to set the impedance of the motor control circuit terminals coupled to lines 118b high. If a train is present on a specific one of the track sections 116 at the time that the detector pulse is sent over lines 118a, the detector pulse causes the corresponding detector circuit 126 to produce a logic level 1 output signal indicating to the microprocessor (and thus to computer 32) that a train is present on that track section. Thereafter, until the next synchronization pulse 206, microprocessor 100 enables motor control circuits 108 (both track section output circuits) using the two logic levels input on lines 114a and 114b in response to commands received from computer 32. (See Table 1 above.) During this time, driving pulses provided to track sections 116 over lines 118a and 118b are selectively PWM by microprocessor 100 to generate a pulse of current for a portion of the time interval between synchronization pulses 206. The duration or pulse width of these PWM drive pulses depends upon the speed desired for the train on the specific track section to which the drive pulse is supplied. In FIG. 5, driving pulses 202 are relatively short in proportion to the total time interval between synchronization pulses 206 and extend between 0 and V$^+$ volts. Accordingly, any locomotive on the track section supplied with driving pulses 202 would run at a relatively low speed, in the forward direction.

Figure 6:
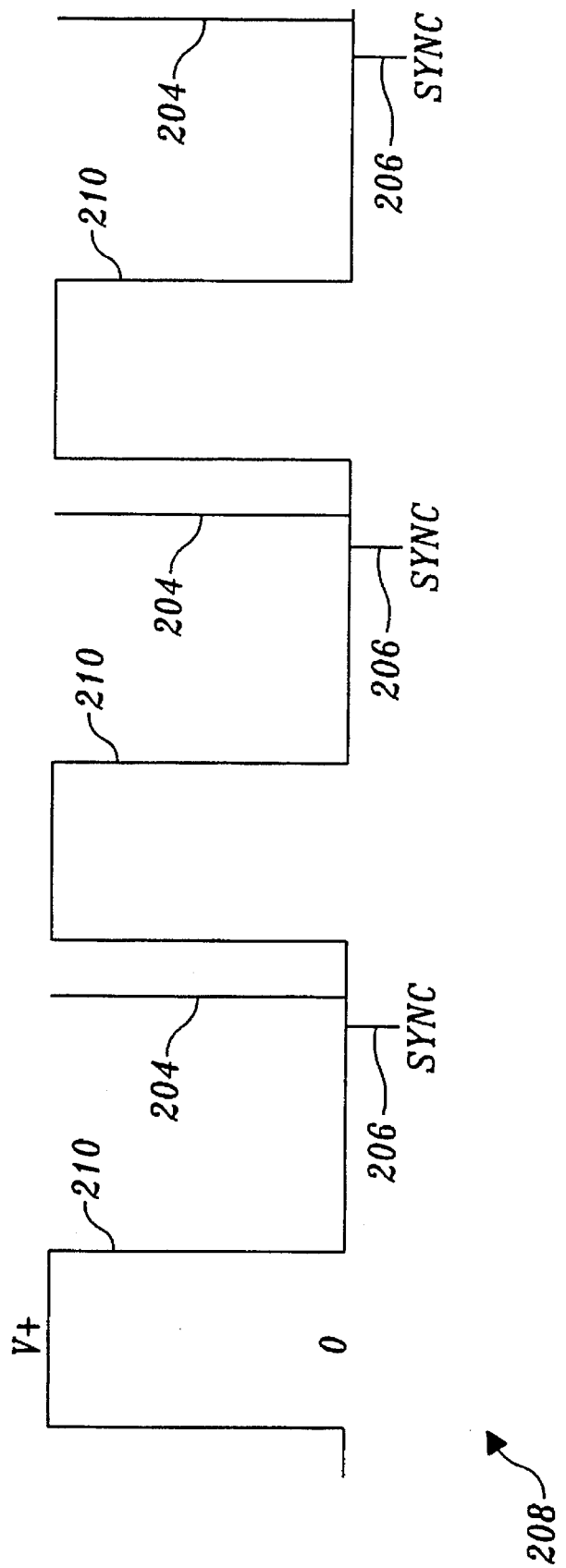
FIG. 6 is a graph illustrating a higher-speed forward direction PWM drive signal and the detection signal.

In comparison, FIG. 6 shows a graph 208 in which a substantially longer duration driving pulse 210 is provided during the period between each of the synchronization pulses 206. Accordingly, a locomotive energized with driving pulses 210 would run at a relatively higher speed than if energized with driving pulses 202 (in FIG. 5).

Figure 7:
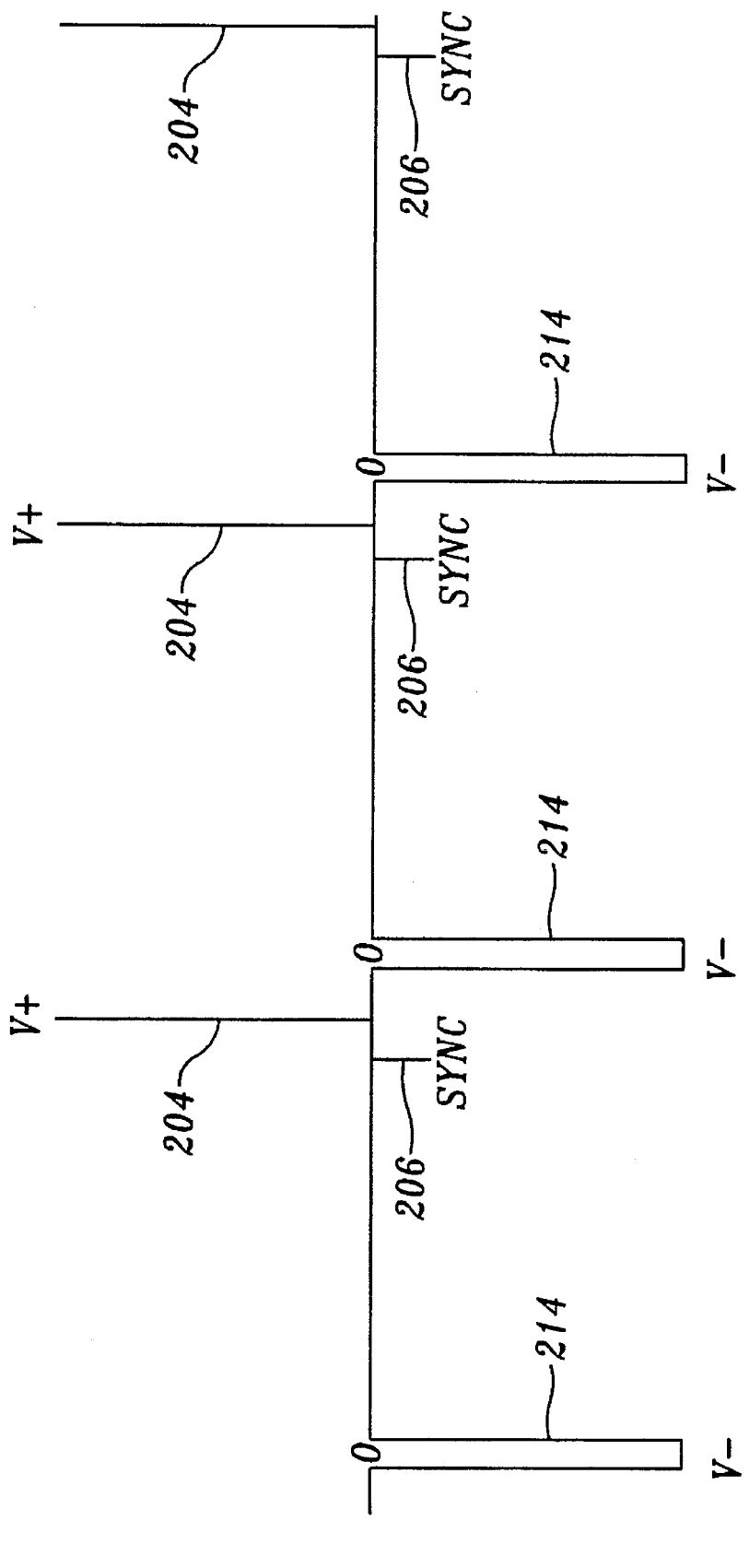
FIG. 7 is a graph showing a low-speed reverse direction PWM drive signal and the detection signal.

When it is desired that the locomotive move in the reverse direction, driving pulses 214 having a negative polarity are provided, as shown in graph 212 of FIG. 7. Thus, since driving pulses 214 are of substantially the same width or duration as driving pulses 202 in FIG. 5, the locomotive would respond by running in reverse at a relatively slow speed. Note, however, that regardless of the direction in which the locomotive is driven, detector pulses 204 continue to have a positive polarity.

Figure 8:
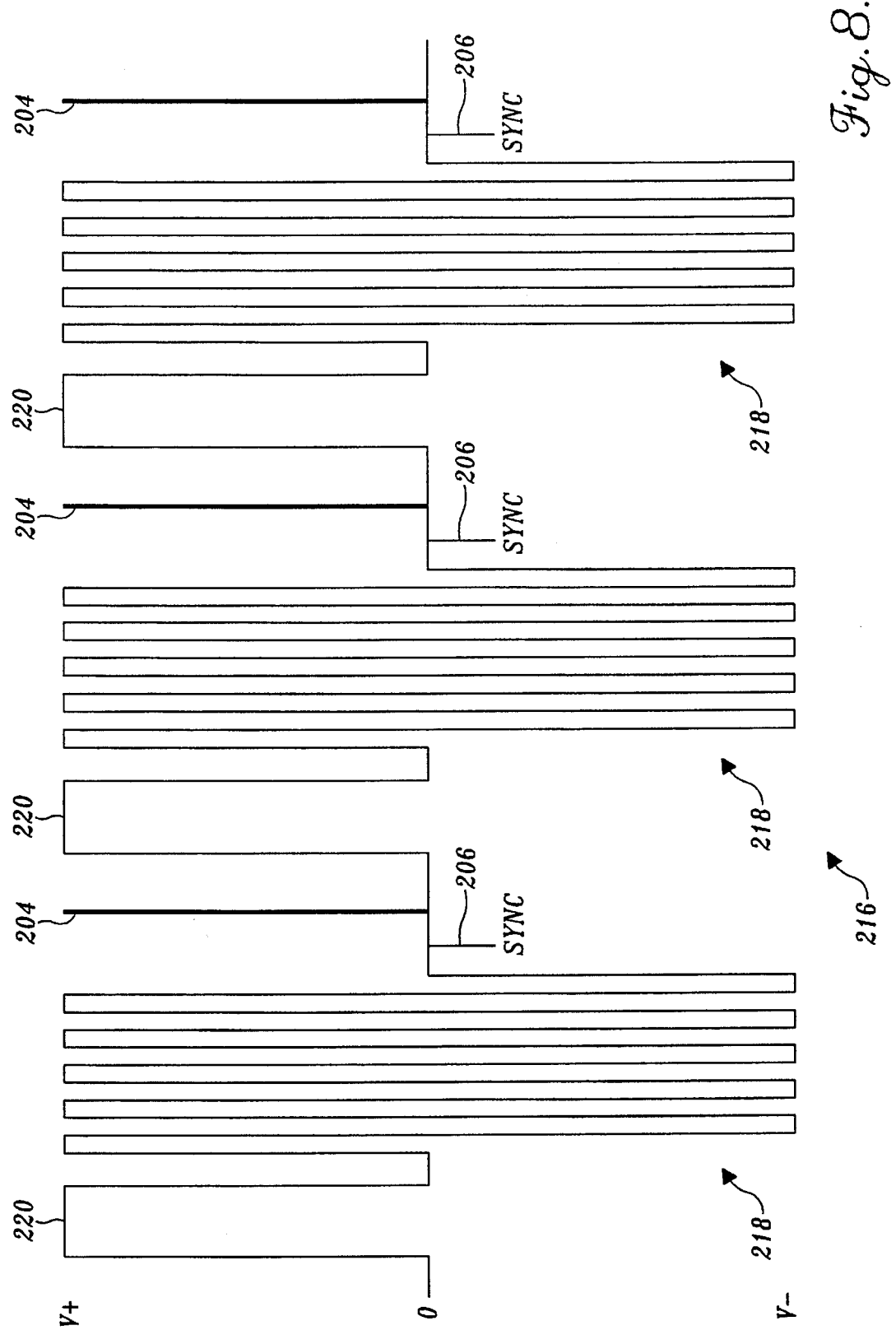
FIG. 8 is a graph showing an AC signal (for energizing accessories) that is time multiplexed with the forward direction PWM drive signal and the detection signal.

It may sometimes be desirable to inject an AC signal from motor control circuits 108 onto track sections 116 in addition to the PWM drive pulses and detector pulses discussed above. The AC signal can be used to energize accessories, such as train lights. Since the AC signal has a relatively high frequency compared to the PWM drive pulses, the average zero value of the AC signal does not affect DC (or PWM) actuated components, such as the locomotive motors. However, the AC voltage is only injected during a portion of the period before each of the synchronization pulses, as shown in FIG. 8. In graph 216, AC signal 218 is periodically injected between driving pulses 220 and synchronization pulse 206. A detector pulse 204 is still provided after each synchronization pulse, before the driving pulse. As in FIG. 5, the proportion of the drive period (up to the next synchronization pulse) when a non-zero voltage is applied to the track section depends upon the desired speed. For low speeds, the drive pulse is narrow or shorter in duration, and for high speeds, the drive pulse extends for the entire portion of the cycle available to each drive pulse. In FIG. 5, the voltage is zero during the period between the end of one drive pulse 202 and the synchronization pulse 206, but in the scheme illustrated in FIG. 8, this period of time is filled with AC signal 218, enabling the accessories, which are energized by both the drive pulse and the AC signal to remain fully active. Consequently, if a train is stopped or moving relatively slowly due to a short duration drive pulse being applied to the locomotive motor, the train lights will still remain at full brightness.

Although the preferred embodiment disclosed above uses a DC PWM signal to energize the locomotive motors, alternatively, locomotives can be provided that are energized using an AC signal on lines 118a and 118b. By modulating the frequency of this AC signal to indicate a series of logical 1's and/or 0's using a FSK technique, commands can be transmitted to detector circuits in the train locomotives. In a graph 222 in FIG. 9, a repeated bit pattern (1101101) is transmitted as an AC signal 224. The FSK modulated AC signal uses a high frequency to indicate a logic level 1 and a low frequency to indicate a logic level 0. This type of scheme is like that currently being adopted as a Digital Command Control (DCC) Standard by the National Model Railroad Association (NMRA). In this scheme, trains contain electronic circuitry that decodes the bit patterns conveyed by the AC signal as data packets. The motors of the locomotives are not directly electrically coupled to the track; instead, the power to drive the motors is drawn from the track by rectifying the AC signal within the train to provide a DC signal that powers the motors in the train locomotives. The speed of the motors and thus, of the trains, is controlled in response to the data packets conveyed by the AC signal.

In the prior art DCC control scheme, a control causes a transmitter to send FSK modulated data packets over the entire track. There are no separately energized track sections that are electrically isolated from each other in the prior art model train layout. The FSK modulated commands coupled to the prior art track layout include an address so that each locomotive or train running on the track layout is separately and selectively controlled in response to the modulated AC signal present throughout all of the track. Each of the trains running on the layout only responds to the data packet commands addressed to it. The disadvantage of this prior art approach is that there is no way to detect where each train is located on the track, unless one of the prior art schemes discussed above in the Background of the Invention is used. For example, a plurality of opto-electronic detectors could be installed at different points on the track layout to detect trains at or passing those points.

Figure 9:
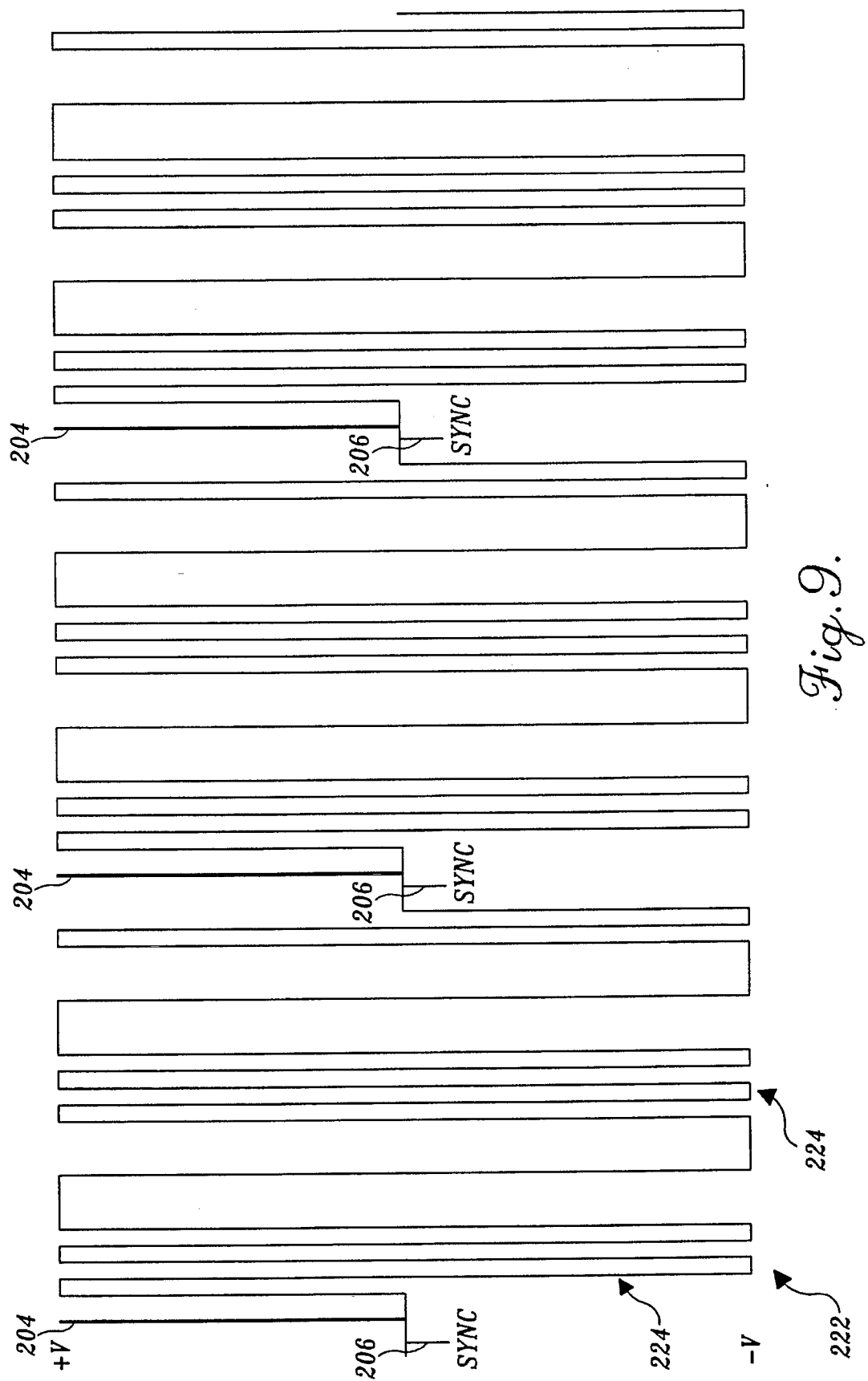
FIG. 9 is a graph showing an AC frequency shift keying (FSK) control signal (with a frequency that changes to represent a pattern of zeroes and ones to indicate the desired train speed) interleaved with a detection signal in accordance with the present invention.

The present invention can be used for scheduling and control of locomotives and trains running on model train layouts employing the DCC scheme just described and has several advantages over the prior art approach that arise due in part to the division of track layout 30, for example, into the plurality of electrical isolated track sections shown in FIG. 1. As shown, in this embodiment, each of the track sections is supplied with an FSK modulated AC driving signal and a detection pulse through the separate pairs of lines that couple the control units to the different track sections. (As already noted, there can be a plurality of different track sections in each of the inner and outer loops and the layout can be much more complex than that shown in FIG. 1.) Yet, unlike the prior art scheme, detector pulse 204 is applied to each track section in the present invention along with the FSK modulated AC signals, as shown in FIG. 9, to enable a train or locomotive to be easily detected on any of the different track sections.

By generating the required FSK modulated AC signals with motor control circuits 108 under the control of computer 32, the DCC speed control data packets can be separately provided to each of the track sections. Since each of the track sections are electrically isolated from each other, if desired, the DCC drive signal can be applied to only those track sections on which a train that responds to the DCC packet data is running. Other track sections can be supplied with the non-digital PWM drive signal to control more conventional trains or locomotives, as discussed above. This type of hybrid embodiment that provides control of the DCC type trains with PWM driven trains is not possible under the prior art, but is in connection with the present invention.

Description of Software

Figure 10:
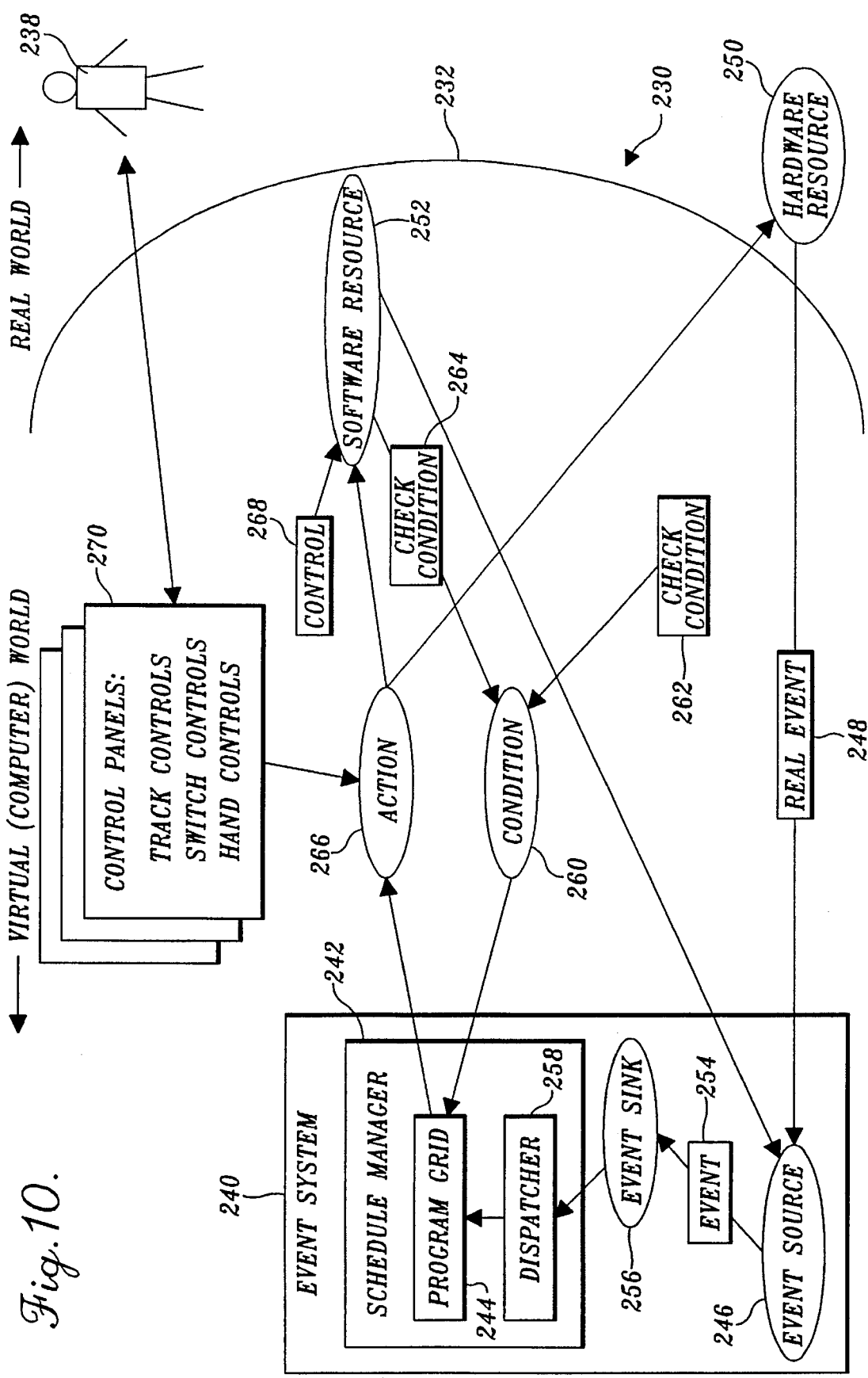
FIG. 10 is a schematic block diagram illustrating the interface between the virtual (computer) environment and the real world in which the present invention operates.

Referring to FIG. 10, an overview diagram 230 illustrates the relationship between hardware and software in connection with the application of the present invention to the control of locomotives running on track layout 30, but the Figure is intended to more generally represent the invention so as to assist the reader in appreciating how it can be applied to many other applications. A curved line 232 represents the hardware interface responsible for communicating between a user 238, and MCU 48 and each of the SCUs described above in connection with the control of locomotives 88 and 90 and of other aspects of track layout 30 (shown in FIG. 1). This hardware interface interacts with the software and is coupled to the control units through the RS-232 serial port of computer 32, as described above. On the left side of hardware interface 232 in the Figure, functional aspects of the software include an event system 240 (or finite state machine) that is defined by user 238, who is part of the real world and therefore appears on the right side of the line represented by hardware interface 232. The virtual (computer) world represented by the software controlling track layout 30 and locomotives 88 and 90 in the preferred embodiment exists on the left side of the line.

Event system 240 includes two distinct parts, the first comprising a schedule manager 242, which reacts to state vectors comprising a program grid 244, and implements the control functions of a dispatcher 258. In response to events and conditions listed in the grid, the schedule manager carries out associated actions 266 that are also defined in the grid. Events are supported by an abstraction wherein each event 254 is an instance of a class created by an event source 246 that is passed to event sink 256 to be handled by dispatcher 258. Each event class has a standard set of behaviors and properties that allow it to be treated uniformly by the event system, and a set of unique properties reflecting the semantics of an actual event. Typically, event sources are developed by the hardware interface, for example, as a result of the hardware detecting a train arriving on a particular track section, or in response to internal components of the software system, such as the lapse of a timer interval. The detection of a train or locomotive on a particular track section uses hardware resources 250 (such as detection circuits 126), which generate a real event 248. In connection with such hardware resources, the software continually monitors the condition of sensors, such as the detector circuits, as provided in a box 262, to determine if a predefined real event has occurred or if a condition 260 has been met. Similarly, in connection with software resources 252 (such as a software timer), a box 264 provides for continually checking to determine if a predefined virtual condition has been met. In response to the occurrence of events arriving from event sink 256 at dispatcher 258, a control action may be implemented by schedule manager 242 as defined by grid 244. These actions may modify software resources 252 or hardware resources 250, for example, by energizing one of the train locomotives to move to a different track section or by resetting a software timer. In addition, hardware resources, such as hand controller 268, can affect software resources 252, since manipulation of the hand controller by the user can cause a concomitant change in corresponding graphical control.

User 238, who exists in the real world, also interacts with the virtual world through control panels 270, which include track controls and electromagnetic switch controls. Thus, user 238 can employ the software and controllers to implement actions 266, thereby affecting either the software resources and/or hardware resources.

Hardware interface 232 enables computer 32 to communicate with the switching network comprising the control units used to control a system, which in the preferred embodiment disclosed above includes the components of track layout 30 and the locomotives running on the track layout. The hardware interface is divided into three elements, including a configuration and diagnostic command interface, a control command interface, and the event interface. The configuration and diagnostic interface is used to send commands to the MCU and SCUs during startup, to synchronize the switching network with the computer. For example, commands are sent by computer 32 during the initial configuration to learn the nature of the attached control units and to assign addresses to each for subsequent use when it is necessary for the computer to route commands to these devices. In addition, the configuration and diagnostic interface can query the state of the control units and instruct each control unit to perform on-board diagnostic tests and to report the results to computer 32.

The command interface is used after system configuration is completed, to send commands to the control units comprising the system. For example, as explained below, the user can graphically control the computer so that it sets the speed of trains running on particular track sections and selectively changes the status of any of electromagnetic switches 42, 44, and 46.

Finally, the event interface provides real-time status information about each device or element that is controlled to computer 32. The event interface is normally asynchronous, so that events can arrive at computer 32 at any time. In the preferred embodiment disclosed herein, the status of one of the control units is communicated to the software application running on computer 32 any time that a change occurs at that control unit. In this preferred embodiment, two types of status changes are handled, including detection of trains entering or leaving track sections, and changes made on hand controllers that set the speed of a train. However, it will be appreciated that virtually any type of meaningful real-world change or event, which can be sensed, can be monitored to inform the control software of a change of status. In the present control system, such status changes are routed as events to the control software for use by the schedule manager. Preferably, hardware interfaces that handle events are associated with corresponding event source modules. In the example discussed above, detector circuits 126 comprise a hardware interface for handling the event represented by the arrival of a train on a particular track section to which a corresponding track section detector module in the software responds.

Figure 11:
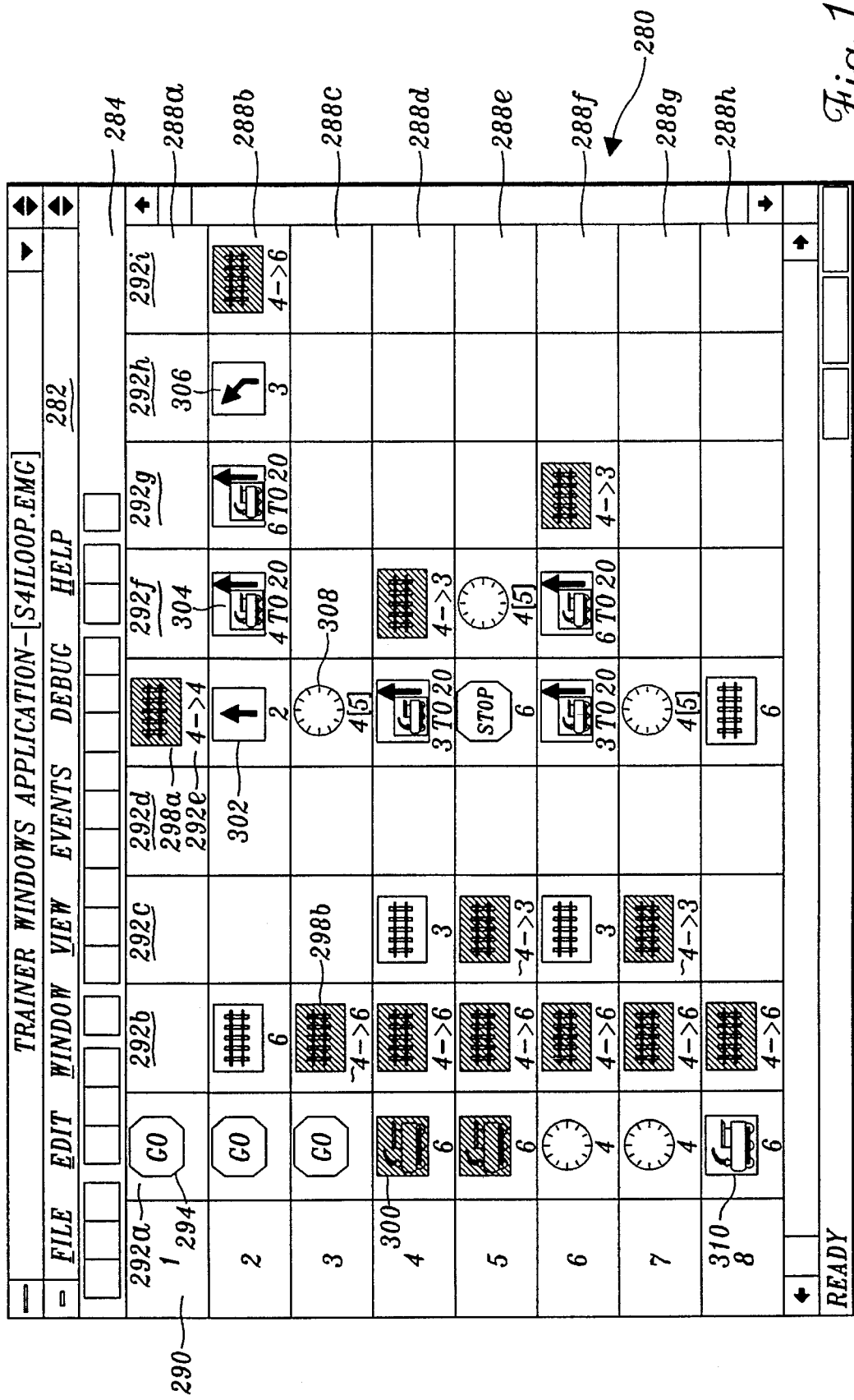
FIG. 11 illustrates an exemplary schedule manager grid used to graphically schedule control actions that will be applied to the controlled toy train system in response to events occurring that meet defined conditions.

Schedule manager 242 graphically supports an abstraction to clearly define how attached hardware should be controlled. Specifically, the schedule manager provides a user interface that enables user 238 to create, view, and edit schedule manager grids. An exemplary schedule manager grid 280 is illustrated in FIG. 11. Schedule manager grid 280, which has many of the attributes of any conventional graphic user interface window, such as vertical and horizontal scroll bars and buttons that allow the window to be resized, also includes a menu bar 282 and a button bar 284 and comprises a plurality of rows 288a through 288h, each row representing a state vector. It will be understood that many more rows can be included and accessed by scrolling down to bring the additional rows into view. A column 290 includes row numbers that sequentially increase. In addition, schedule manager grid 280 comprises a plurality of columns 292a through 292i (shown in the window represented by FIG. 11), but again, it will be appreciated that additional columns may be included that are accessed by scrolling to the right, to bring the additional columns into view.

In the schedule manager grid, column 292a specifies an event for each of the rows or state vectors comprising the schedule manager grid. Each event in column 292a is followed by any conditions that are to apply in the state vector (i.e., by zero or more conditions), each condition occupying an additional column element in the row. Following the conditions in each row (if any) are one or more elements that contain a graphic specification for an action to be taken when the event occurs, if any conditions imposed have been met.

A user defines the schedule manager grid row-by-row, by selecting a particular element in the button bar or menu bar that displays a group of graphic icons representing events, conditions, or actions. From the displayed group of icons, one of the icons is selected using the cursor and mouse 82 and then dragged to the desired row and column position in the schedule manager grid. The drag-and-drop technique employed to thus create elements of each row in the schedule manager grid is well known to those of ordinary skill in the art in connection with other graphic user interface software applications, and need not be further discussed at this point. It is sufficient to note that graphic icons representing each of the possible events, conditions, and actions to be taken are selectively displayed by the software to enable a user to define virtually any kind of control abstraction for a particular device controlled by the software. For example, the control of the locomotives, the status of the electromagnetic switches, and the operation of virtually any other electrically actuated accessory associated with track layout 30 can be controlled and scheduled in any way desired by the user. In addition to selecting the graphic icons that represent events, conditions (if any), and control actions desired, the user can also specify variables, such as speed, or time intervals that will apply to an associated event, condition, or control action.

Details of the control parameters represented by several exemplary graphic icons shown in schedule manager grid 280 will help to clarify some of the control options available to the user when defining the state vectors corresponding to the rows of the schedule manager grid. An event icon 294 having a "GO" label indicates that the following corresponding control action in the row should be implemented when the schedule manager grid is activated. An icon 298a in the row indicates that a train 4 should "take possession of" or "own" a track 4. (Note that "train 4" and "track 4" and other such references in schedule manager grid 280 are arbitrary examples and do not correspond to any track section or locomotive on track layout 30 in FIG. 1.) The terms "take possession of" or "own" indicate that the train has the exclusive right to be present on the designated track section. It will be apparent that the safe control of a plurality of trains on a track layout requires that only one train or locomotive at a time be present on a given track section, thereby avoiding the possibility of collisions and ensuring that each train or locomotive is separately controlled. Conversely, an icon 298b in row 288c and column 292b with its associated descriptive text "4–>6" indicates that train 4 does not have possession of or own track 6 (the tilde denotes the negative condition).

A timer icon 308 with the associated variable "4[5]" indicates that a timer 4 is to be set for a five-second countdown. The events, conditions, and control action defining one vector state are assembled in a row by the user to achieve a desired result. For example, an icon 300 with the associated text variable "6" in row 288d indicates that the event corresponds to any train arriving on track 6. The next two elements of row 288d are conditions that must be met. Specifically, train 4 must own or have possession of track 6, and track 3 must not be owned by any train. If the event and conditions are met, the control actions represented by the graphic icons in columns 292e and 292f of row 288d set the speed for the train running on track 3 to 20 and assign ownership of track 3 to train 4. Other actions that can be implemented include changing the status of a switch, as represented by an icon 306 in row 288b and column 292h, which shows a switch 3 being moved to a left position. Further, an icon 310 (column 292a, row 288h), which is a different color than icon 300, indicates that a train has left track 6. Events, conditions, and control actions are evaluated row by row, from top to bottom of the schedule manager grid. The graphic icons discussed above are examples of various types of events, conditions, and actions that can be combined to define a schedule manager grid, but many other icons representing other events, conditions, and control actions can be provided. For application of the present invention to the control of other types of systems, event, condition, and action icons appropriate to the application and system being controlled would be provided. Accordingly, it should be evident that the schedule grid manager represents a form of a finite state machine that is used to control virtually any type of devices in a system.

The software underlying the schedule manager must provide support for the following functions: (a) creating or defining an element in the schedule manager grid; (b) performing a specified condition check under the control of dispatcher 258; and, (c) implementing a control action when called upon by the dispatcher. In addition, the software must provide a mechanism for dispatcher 258 to identify events in the schedule manager grid that match an event that has occurred either in the virtual world or the real world.

Events, conditions, and actions tend to be implementation dependent or application specific, being dictated primarily by the attached hardware and type of system being controlled. However, certain types of events, conditions, and actions would likely be provided regardless of the hardware or type of system being controlled, because of their general applicability to virtually any control paradigm. Those control events that are implementation dependent include actions that must be implemented so as to map onto a full set of control commands that can be sent through the hardware interface to the attached hardware elements. In the preferred embodiment that is discussed above, such actions are those associated with the control of devices on the track layout and locomotives running thereon. For example, the elements of the schedule manager grid will include events responding to a track becoming occupied or a track becoming unoccupied, and conditions such as a track being occupied or unoccupied, or an electromagnetic switch being set in some manner (for example, right, left, or straight to control the track section to which a train will be directed), or a locomotive speed and direction, set in a predefined manner. The implementation specific actions include setting speed and direction for a locomotive running on a track section, setting an electromagnetic switch to a defined state, and dealing with changes in train speed that take into consideration the momentum of the locomotive and the attached cars. Ideally, the software should react to the rate at which a train running on a particular track section attains a new speed or slows so as to accurately emulate the behavior of a real locomotive, in the scale of the track layout. Computer 32 handles such functions transparently by sending successive speed commands through the token ring network to the MCUs and SCUs to change the speed of a selected train in a series of steps. The mass and other characteristics of the locomotives and other cars in the trains being controlled can therefore be input as user supplied variables, to ensure faithfully realistic control of the trains.

More generally, these three types of schedule manager grid elements—events, conditions, and actions, which are implementation specific, include such things as activation and deactivation events and corresponding actions. For example, when a schedule manager grid is activated, at least some of the rows can be associated with the event represented by its activation, which is useful for setting up an initial state of the system being controlled. Similarly, when a schedule manager grid is deactivated, that very deactivation can be associated with certain rows, just as any other event is, and such rows can be executed just before the schedule manager grid becomes deactivated. Thus, for purposes of controlling the flow of control actions, a specified schedule manager grid can activate another schedule manager grid, or, alternatively, deactivate itself or another schedule manager grid.

Another generalized type of element is a set of software timers, which operate as real time clocks. In the preferred embodiment, each schedule manager grid has a fixed number of timers at its disposal. In addition, a set of global timers is provided. Actions using the timers include setting a timer to start timing at a specified future time and deactivating a current timer before the time it will time out. In addition, an event can be associated with the expiration of a time interval determined by a timer so that the schedule manager waits for a specified period of time before taking a defined control action.

A key aspect of the present invention relates to "ownership events, conditions, and actions" noted above in connection with a train owning a track section. The concept of ownership allows the schedule manager to take control of a global resource (virtual or real) before trying to perform any actions upon it. Such resources are typically physical entities in the hardware system being controlled, such as track sections, although they need not be in other implementations. In the preferred embodiment disclosed above, the schedule manager adheres to a protocol that requires ownership of a track section by a train before any attempt is made to control it, for example, by setting a speed of a locomotive running on it. For this reason, it is appropriate for each schedule manager grid to be associated with a specific train that is following a route designated by the schedule manager grid, so that the schedule manager successively assigns exclusive ownership of track sections along the designated route to the train before advancing the train over each track section. In the event that the next track section needed to advance a first train is owned by a second train operated by a different schedule manager, the first train is made to wait, as if it were at a stop signal.

In connection with the ownership of a specific resource, certain events, conditions, and actions are provided, independent of the resources that are owned. For an action to be taken, ownership of the resource with which the action is associated must have been granted. The dispatcher determines which schedule manager grid gains access to such events when they occur. For conditions, a resource can be: owned by the device controlled by the schedule manager grid, not owned by it, free of any ownership, or owned by a device controlled by another schedule manager grid that is not specified. Actions associated with ownership include: requesting ownership of a resource by the schedule manager, and freeing a resource for ownership by another device controlled by a different schedule manager grid. One of the reasons that ownership is so important in the present control scheme is that the schedule manager grids use heuristic means to prevent interactions between themselves; for example, to prevent collisions between trains that are being operated according to different schedule manager grids. Failure to follow these principles can result in trains colliding because they are attempting to operate on the same track. In the preferred embodiment, owners are indicated with arbitrary numbers that are available for use globally. Although it is sometimes convenient to associate a schedule manager grid with the control of only one train, this convenience is not enforced in the control scheme.

It should be apparent that when the present invention is used in other control applications, the concept of resource ownership may be totally unimportant. Accordingly, it is contemplated that the requirement for ownership be relaxed or completely ignored when the present invention is applied to controlling resources in such applications where ownership is not critical.

Dispatcher 258 is responsible for activating and deactivating schedule manager grids, routing events to the appropriate active schedule manager grid, and calling condition and action elements in a row in which events have occurred. To enable a user to properly specify the events, conditions, and actions comprising rows or state vectors of a schedule manager grid, the user must be able to predict the behavior of the system being controlled and, thus, to design the schedule manager grid so that the dispatcher performs the preceding tasks in a well-defined manner. For example, the user must be aware that the dispatcher will search through the active schedule manager grids in the order in which they are activated any time that an event occurs. Thus, when an event happens, the first activated schedule manager grid is searched before subsequently activated schedule manager grids. Secondly, the user must know that within a specific schedule manager grid, the dispatcher compares the event that has just occurred with the events in the first column of each of the rows in the schedule manager grid, starting at the top and working toward the bottom. The first row or adjacent multiple rows in which the event that has just occurred matches the event specified are then activated. For example, in FIG. 11, the event in rows 288*d* and 288*e* corresponding to the arrival of any train on track section 6 will trigger activation of those two rows. The actual comparison between an event that has just occurred and the events specified in a given schedule manager grid is not a function of the dispatcher. Instead, the dispatcher simply passes an event to the event implementation portion of the schedule manager, which then performs the comparison. As a result, all sorts of complexity are possible, including, for example, enabling an ownership event to maintain a private list of control actions that are waiting for a resource to become free, and only matching the event with an event in the list associated with a control action having the highest priority. Third, the user must know that if a schedule manager grid has multiple rows with event icons corresponding to an event that has just occurred, the event is dispatched by the dispatcher to each row in turn, moving from top to bottom. Finally, the dispatcher follows a protocol wherein within a given row, the conditions, and then the actions, are checked and implemented from left to right.

Figure 12:
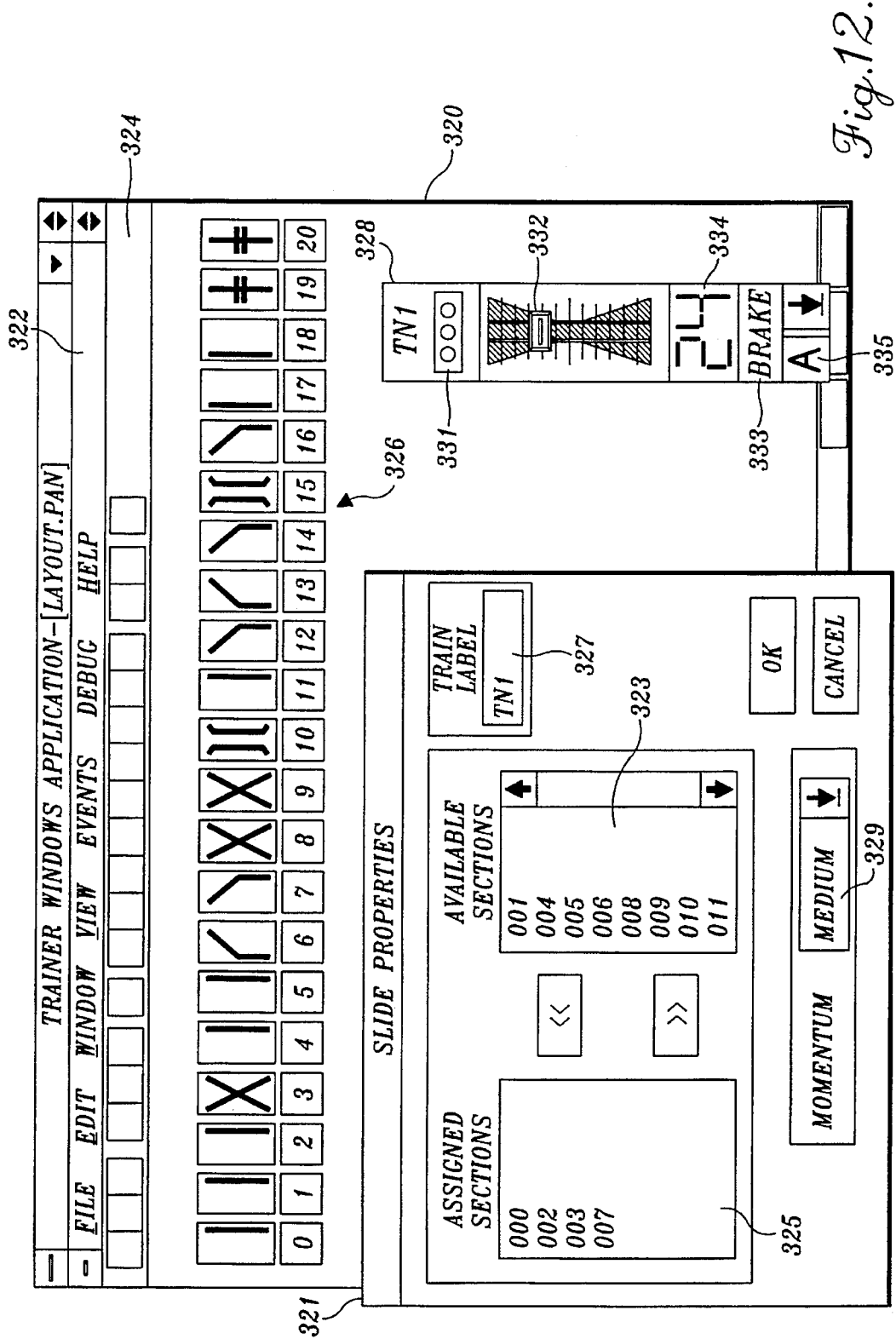
FIG. 12 is an example of a control panel created by the user to enable manual control of the train system by manipulation of the graphical controls.

As just explained, the schedule manager grids allow a user to define a series of scheduled or automated control actions using events and conditions to determine when or if the control actions are implemented. However, the present invention also includes a visual graphic user interface that enables a user to have direct manual control over the system. In the preferred embodiment, the user can directly manipulate graphic controls to set the speed of trains running on selected track sections and set the status of selected electromagnetic switches in track layout 30. To facilitate such graphically implemented manual control, the software allows the user to create graphic control panels. An exemplary graphic control panel 320 is shown in FIG. 12. Such control panels are free-form windows onto which a user places control icons corresponding to real world hardware elements using the drag-and-drop technique discussed above, in connection with the creation of the schedule manager grids. These graphic representations of such real world elements are then manipulated by the user (with the cursor and mouse), causing a corresponding change in the status of the real world devices. Graphic manipulation of the icons and symbols representing such real world elements are convened into control signals by computer 32 and are output as commands to the MCUs and SCUs so that corresponding control actions are taken by the real world elements.

In FIG. 12, a control panel 320 includes a menu bar 322 and a button bar 324 in a format generally consistent with other windows of the graphic user interface used in the preferred embodiment. Control panel 320 includes graphic icon representations of 20 different electromagnetic switches 326, showing their current status. It should be noted that the 20 electromagnetic switches do not correspond to the switches in track layout 30, but are simply included by way of illustration to show how the electromagnetic switches in a more complex train layout could be graphically represented in control panel 320.

In addition, a graphic speed control 328 is included in control panel 320 and is manipulated by the user selecting a slider 332 using the cursor and then moving the slider with the cursor, in the manner customarily used in graphic user interfaces of this type. The user moves the slider graphically to actually change the speed of a train on the associated track sections controlled by the graphic speed control. The speed thus selected by the user is indicated digitally in a small window 334 below slider 332 on speed control 328, with a range between ±31 in the preferred embodiment. To set the speed in the reverse direction, the user holds the Shift key on the computer keyboard while adjusting slider 332 with the cursor and mouse. A brake button 333 is graphically actuated to slow the train while the user depresses the mouse select button with the cursor on the brake button.

Each speed control is associated with an HCU selected from a drop-down window 335, which are arbitrarily designated "A," "B," "C," etc. A set of "signal lights" 331 selectively display red, yellow, or green based upon the status of the train controlled by the graphic controller, i.e., green if it is free to run on the next track section, yellow if the track section after the next is occupied by another train, and red if the next track section is occupied.

The graphic control is associated with specific track sections as designated by the user when setting up control panel 320 and with a specific train running on the track sections that is also determined by the user. To enable the user to make these selections, a dialog box 321 opens over the control panel window. The dialog box includes a list of available track sections 323 from which the user can select with the cursor and mouse those to be controlled by the graphic control, causing them to appear in a list of assigned track sections 325. A label for the train running over these track sections that is controlled by the graphic control can be entered in text box 327. Another box 329 is provided to enable the user to select a relative virtual mass of the train (light, medium, or heavy) that affects the "momentum" or rate at which the train accelerates or brakes in response to user actuation of the graphic control.

Since operation of control panel 320 by a user may interfere with settings that are being controlled automatically by the schedule manager, a user would normally not manually manipulate graphic controls corresponding to devices that are currently being automatically controlled. The software can optionally be set by the user so that the automatic control of the schedule manager overrides the manual control, for example, to avoid the manual control causing a collision between two trains.

Figure 13:
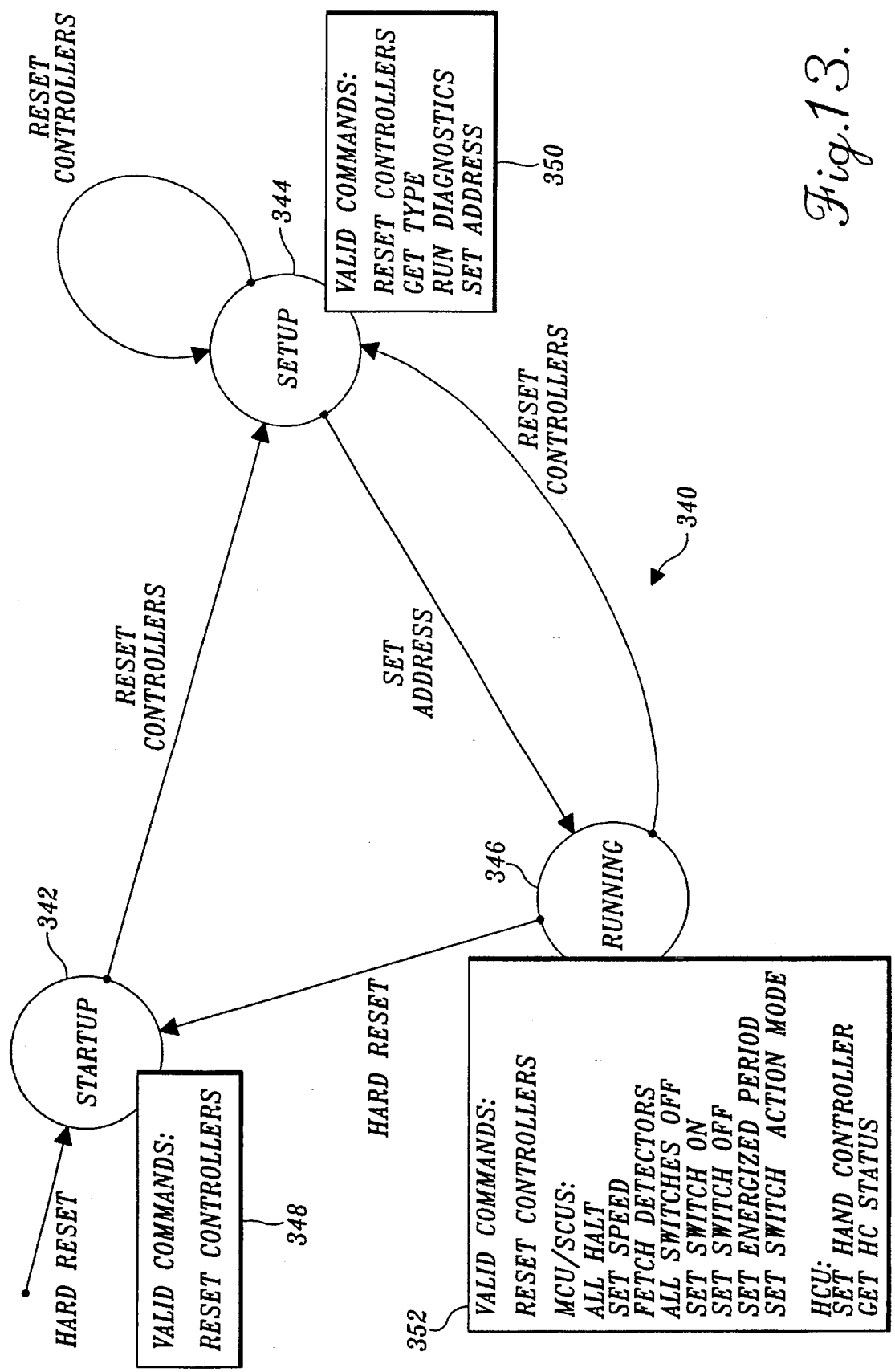
FIG. 13 is state diagram illustrating the control commands that can be sent to the MCU, SCUs, and HCUs by the computer during reset, startup, and running of the control system.

FIG. 13 is a state diagram 340 illustrating the control protocol for communications between computer 32 and the control units. During an initial startup 342 of the control system, all control units are unable to respond to any other command besides "Reset Controllers," as indicated in a block 348. This command causes the control units to examine their configuration switches and prevents spurious interrupts from affecting the operation of the control system. Next, all control units are configured during setup, as indicated in a circle 344. The valid commands during setup are listed in a block 350 and include the command for setting the address to each control unit in succession. After the address is set for a control unit, the control unit ignores all further configuration commands except "Reset Controllers," thereby enabling a mask program to be used as addresses are assigned during the setup. After the setup is completed, the control system begins running, as indicated in a circle 346. The valid commands that can be issued while the control system is running are listed in a block 352. Certain commands are valid to the MCU and SCUs and other are specific to the HCU. A hard reset (e.g., power off followed by power on) returns the control system to the startup state. Similarly, if a "Reset Controllers" command is issued, the system returns to the setup state.

Figure 14:
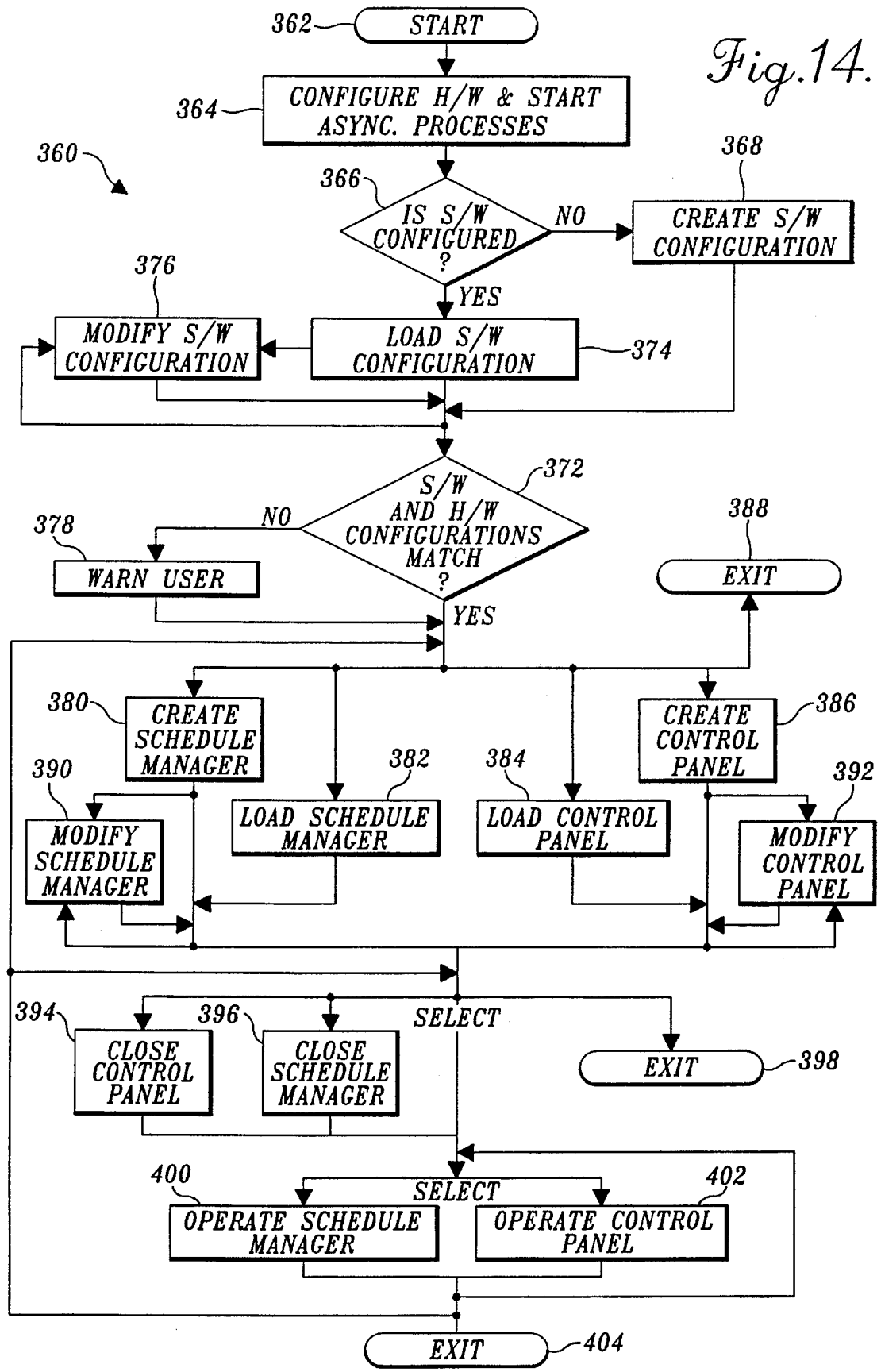
FIG. 14 is a flow chart showing the overall control logic implemented in software in defining and operating the control system.
Figure 19:
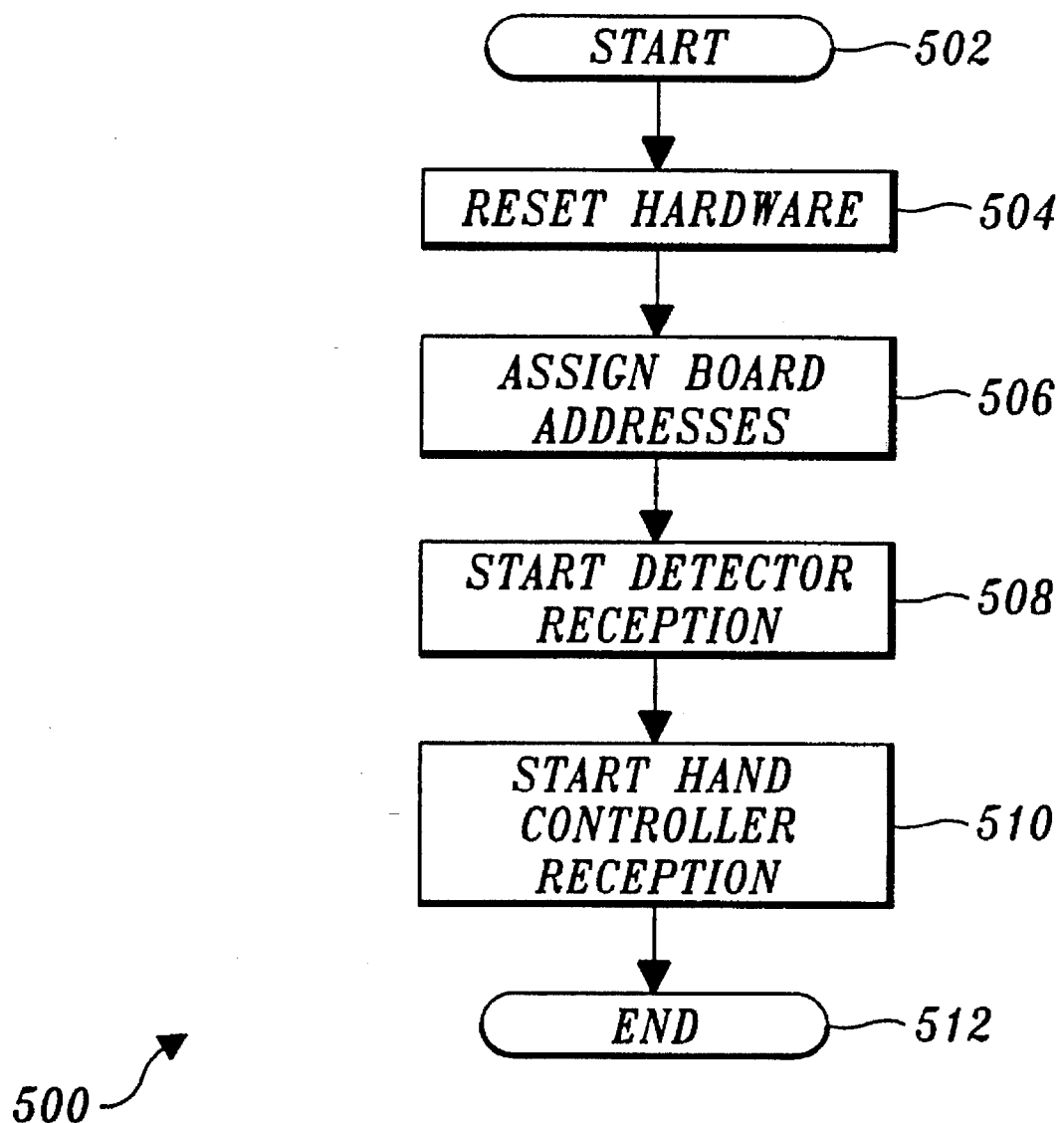
FIG. 19 is a flow chart of the logic employed in configuring the hardware and start the asynchronous processes used by the hardware.

A flow chart 360 in FIG. 14 generally shows the logical steps implemented in the control system software for configuring the software and hardware, and for developing the schedule manager grids that define automated control of the system. The process starts in a block 362 when the control software program is initiated and proceeds to a block 364 that provides for configuring the hardware and starting the asynchronous processes. The steps carried out in block 364 are presented in a flow chart 500, which is shown in FIG. 19. From a start block 502, the first step in a block 504 is to reset the hardware, which involves providing a reset signal for microprocessors 100 in each of the control units. Thereafter, in a block 506, computer 32 assigns addresses to each successive control unit in the system, as the token is passed from one control unit to another in the token ring network. Next, in a block 508, track section detector reception is enabled so that the software can be informed of the track sections on which trains are disposed. In a more generalized sense, i.e., for use in other control applications, block 508 would involve enabling any sensors or monitors in the system being controlled. A block 510 provides for starting hand controller reception so that the system can immediately respond to throttle, braking, and direction input signals from any of the hand controllers coupled to HCU 150. The hardware configuration and asynchronous process startup terminate in a block 512, returning logical control back to flow chart 360 in FIG. 14.

Figure 22:
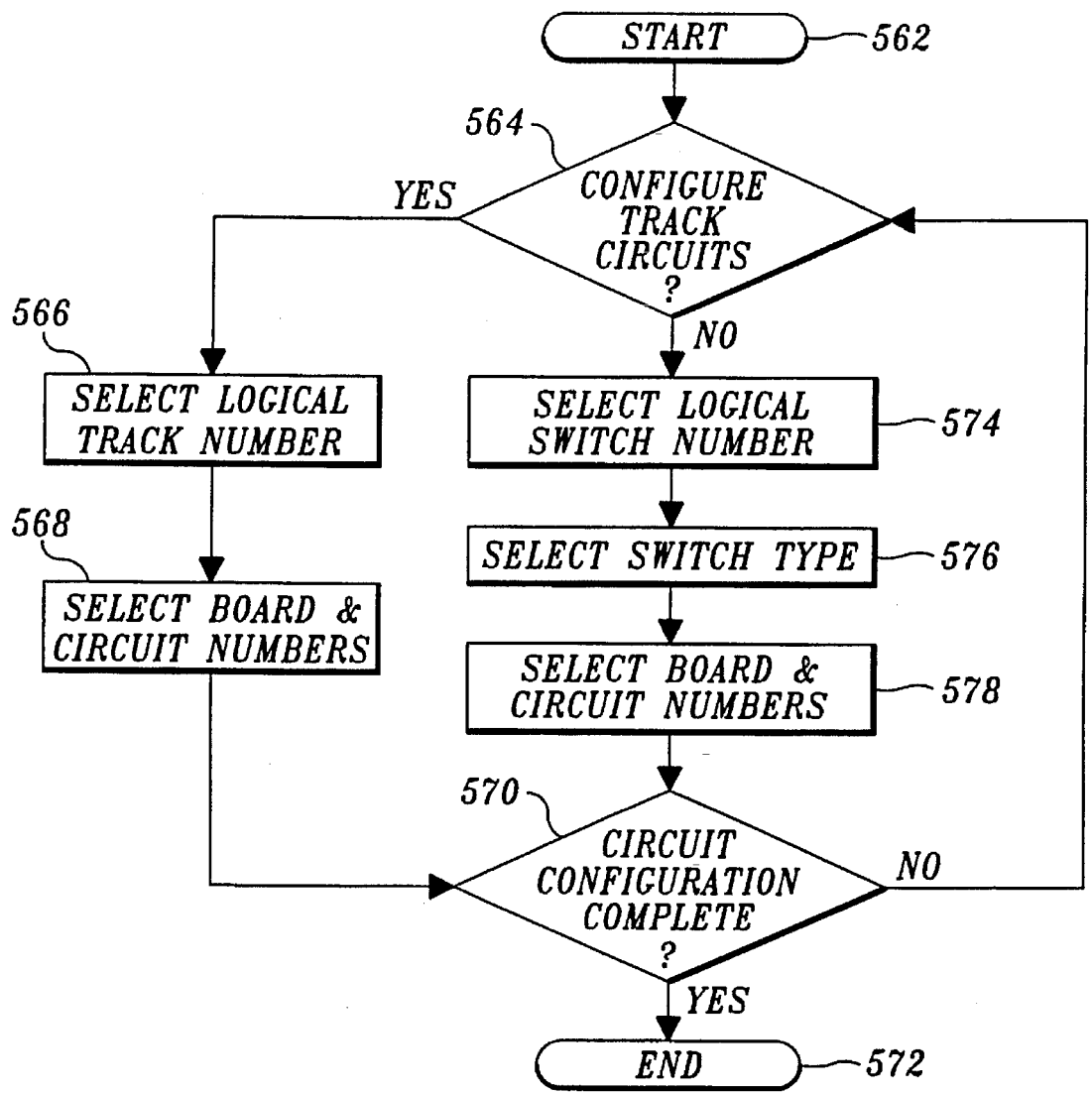
FIG. 22 is a flow chart showing the logical steps involved in creating a new software configuration corresponding to the track layout.

A decision block 366 then determines whether the software has been configured for the system being controlled. If not, a block 368 initiates the steps required for creating the software configuration. The logical steps involved in creating a new software configuration are shown in flow chart 560 in FIG. 22. From a start block 562, a decision block 564 determines if the various track sections and switches comprising different track circuits in model layout 30 have been configured. If they have, a block 566 selects logical track section numbers that are assigned to each track section in the layout. (These track section numbers correspond to the "track numbers" referenced in connection with exemplary schedule manager grid 280 in FIG. 11.) Then a block 568 identifies the control unit that is associated with the various track circuits, i.e., the control unit that controls the PWM drive pulses applied to each track section, for the track circuits in the track layout. The logic then proceeds to a decision block 570 that determines if the track circuit configuration has been completed. If not, the logic returns to decision block 564 to continue with the configuration of the track circuits.

If decision block 564 determines that the track sections and switches have not been configures, in a block 574, the logic provides for selecting a logical switch number for each of the electromagnetic switches. In addition, a block 576 identifies the switch type for each electromagnetic switch identified by the number selected in the preceding block. Board and circuit numbers are selected and assigned to each electromagnetic switch of a particular track circuit in a block 578. Thereafter, decision block 570 determines if the track circuit configuration is completed and, if so, proceeds to a block 572 that ends the process.

Returning back to FIG. 14, if the software has previously been configured and stored as a file, a block 374 provides for loading a selected software configuration file. Once a previously defined software configuration file is loaded, the user has the option of modifying the software configuration in a block 376. Modification of the software configuration might be needed if the track layout has been changed by adding additional electromagnetic switches or changing track circuits or if the user has modified the way in which the electromagnetic switches and track sections are coupled to the control units. A user can also optionally modify the software configuration that was just created in block 368.

A decision block 372 checks to determine if the software and hardware configurations match. In other words, the control program determines if all track sections have been assigned to the control of specific control units in a logical fashion. If not, the user is warned in a block 378. If the software and hardware configurations do match, the user may select one of five possible options.

Figure 20:
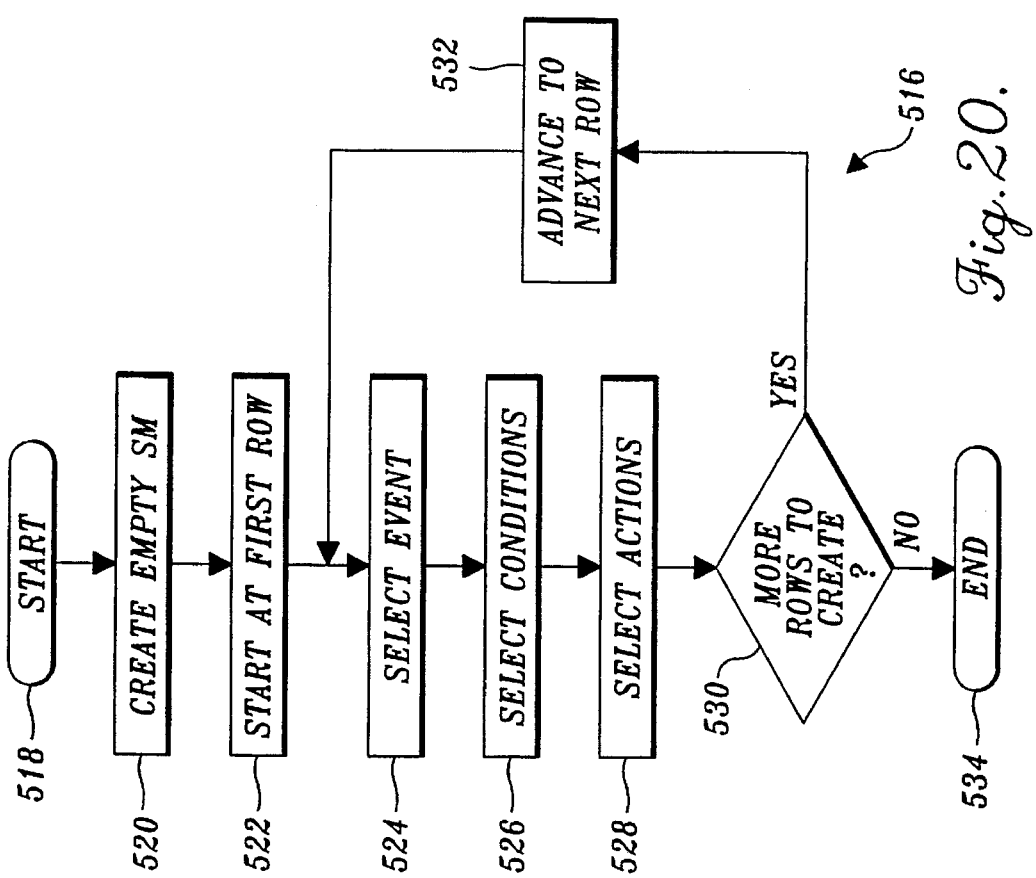
FIG. 20 illustrates the logical steps that occur as the user creates a schedule manager grid.

The first option, which is indicated in a block 380, enables the user to create a new schedule manager grid. The logical steps implemented in this option are shown in a flow chart 516 in FIG. 20. From a start block 518, the user creates an empty schedule manager grid in a block 520. Starting at the first row of the empty schedule manager grid, as noted in a block 522, and in a block 524, the user selects an event corresponding to one of the graphic icons in button bar 284 on the schedule manager window. Then, the user optionally selects the condition (if any), as indicated in a block 526, and identifies actions that are to be carried out once an event happens and any conditions selected by the user are met, as noted in a block 528. A schedule manager grid may have only a single row, but more typically has a number of rows. Therefore, a decision block 530 determines if the user is interested in creating more rows or state vectors for the schedule manager grid. If so, a block 532 advances to the next row and returns the flow of logic to block 524 so that the user can select an event, any conditions, and one or more actions for the next row of the schedule manager grid using the graphic drag-and-drop technique discussed above, or alternatively, by selecting menu items that correspond to a desired event, condition, or control action. The user may also provide variables such as speed or time, which are associated with one or more of these elements. Once the schedule manager grid is completed, the logic proceeds to an end block 534. Returning to FIG. 14 and following decision block 372, another option that the user has is to load the schedule manager, as indicated in a block 382. This step presumes that at least one schedule manager grid has already been created and possibly stored as a file on the hard drive or on a floppy disk for access by computer 32.

A block 386 provides the user the option of creating a graphic control panel. As noted above, the graphic control panel enables the user to graphically manipulate a graphic control that causes a corresponding change in a device on the system being controlled. In addition, if hand controller 152 is employed in the system, any manual manipulation of the throttle, brake button, and/or direction switch on hand controller 152 is reflected in a corresponding change in the graphic controls on the control panel created by the user.

Figure 21:
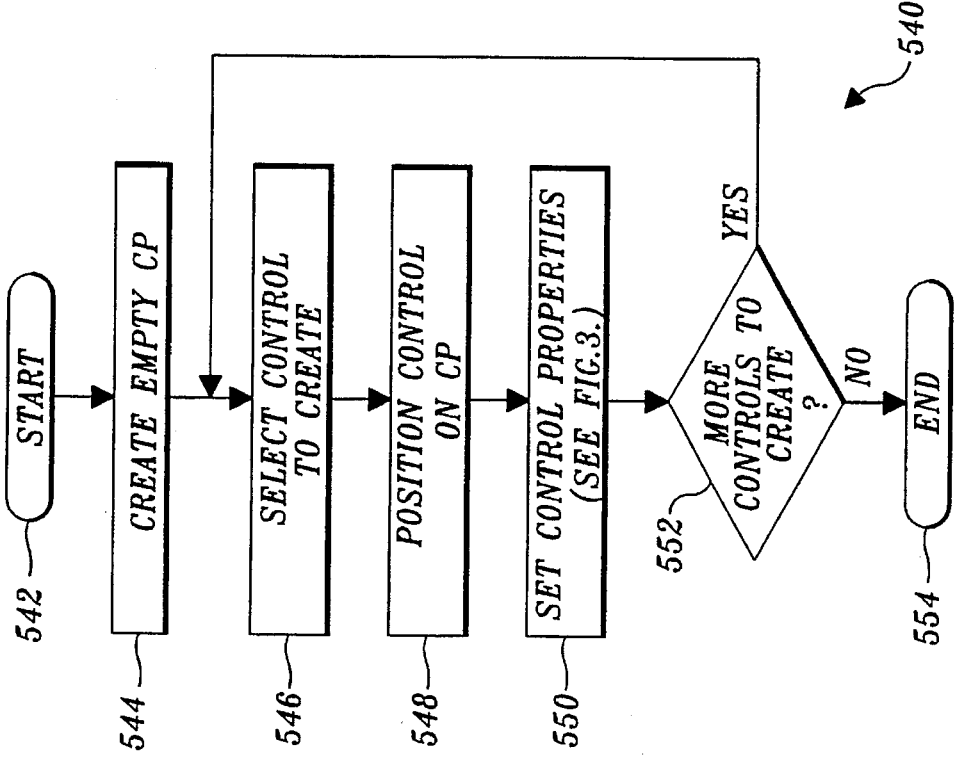
FIG. 21 is a flow chart showing the logical steps that are followed as the user creates a control panel.

The steps involved in creating a control panel are illustrated in a flow chart 540 in FIG. 21. From a start block 542, the user creates an empty control panel window in a block 544. Next, in a block 546, the user selects the specific graphic control icons that will be added to the control panel, such as speed control icons or electromagnetic switch icons, as discussed above in connection with exemplary control panel 320. Using mouse 82 to control the cursor, the user selects the control just added to the window for the control panel and positions it in a desired location within the control panel window in a block 548. Once the graphic control icon has been selected and properly positioned, a block 550 provides for the user setting the control properties, such as indicating the particular track section(s) or train with which the control icon is associated, the mass of the locomotives and cars in the train, and the current condition of an electromagnetic switch. A decision block 552 determines if the user desires to create additional graphic controls in the control panel and, if so, returns to block 546 to repeat the steps discussed above. Otherwise, the flow of logic for creating the control panel ends in a block 554.

Once a control panel has been created by the user (block 386), it can be stored as a file and thereafter, as noted in a block 384 (FIG. 14), optionally loaded from the stored file, which is maintained on a floppy disk or in the hard drive of computer 32. However, if a user is not interested in creating a schedule manager grid, loading a previously created schedule manager grid, or in creating a control panel or loading a previously created control panel, the user may instead exit the program, as indicated in a block 388.

After a schedule manager grid has been created, or once it has been loaded from a stored file, the user also has the option of modifying it as indicated in a block 390. Such modifications might be used to change the times that the trains are scheduled to run on certain track sections or modifying the route of a train. Similarly, the control panels that have previously been created or are loaded from a file can be modified, as indicated in a block 392. The user also has the option of closing a control panel, as provided in a block 394, or closing a schedule manager grid as indicated in a block 396. Alternatively, the user may again elect to exit the software control program in a block 398.

A fourth option that most often would be selected by the user is to continue to operate the schedule manager in accordance with a block 400, or to operate the graphic control panel in accordance with a block 402. At any time, the user can switch between the schedule manager window and the control panel window, or may elect to exit the program, as provided in a block 404.

Figure 15:
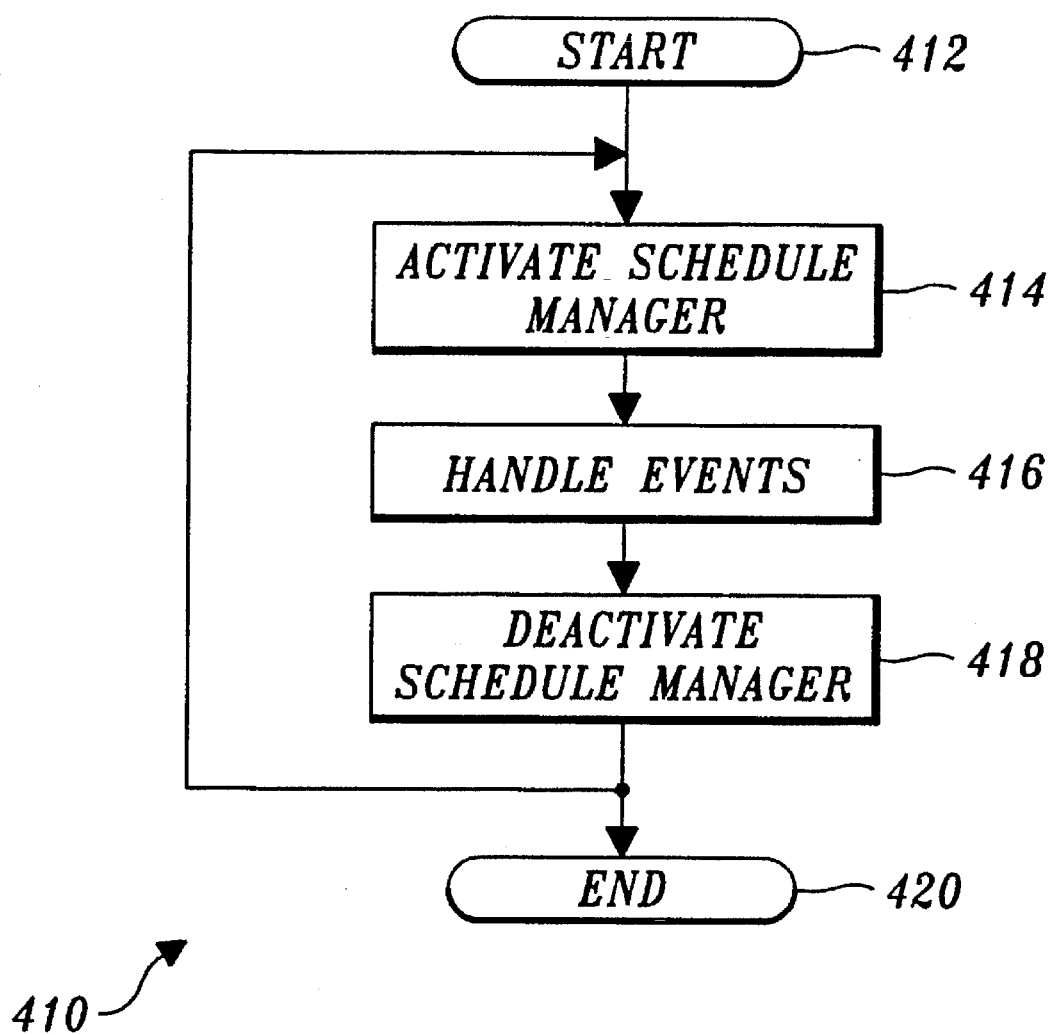
FIG. 15 is a flow chart illustrating the logical steps employed during operation of the schedule manager.

The logical events involved in operating the schedule manager grid are disclosed in FIG. 15, in connection with a flow chart 410. From a start block 412, the user activates the schedule manager in a block 414, typically by selecting an icon in a window of the graphic user environment. Once the schedule manager is activated, it proceeds to handle any events that may occur, as noted in a block 416.

Figure 18:
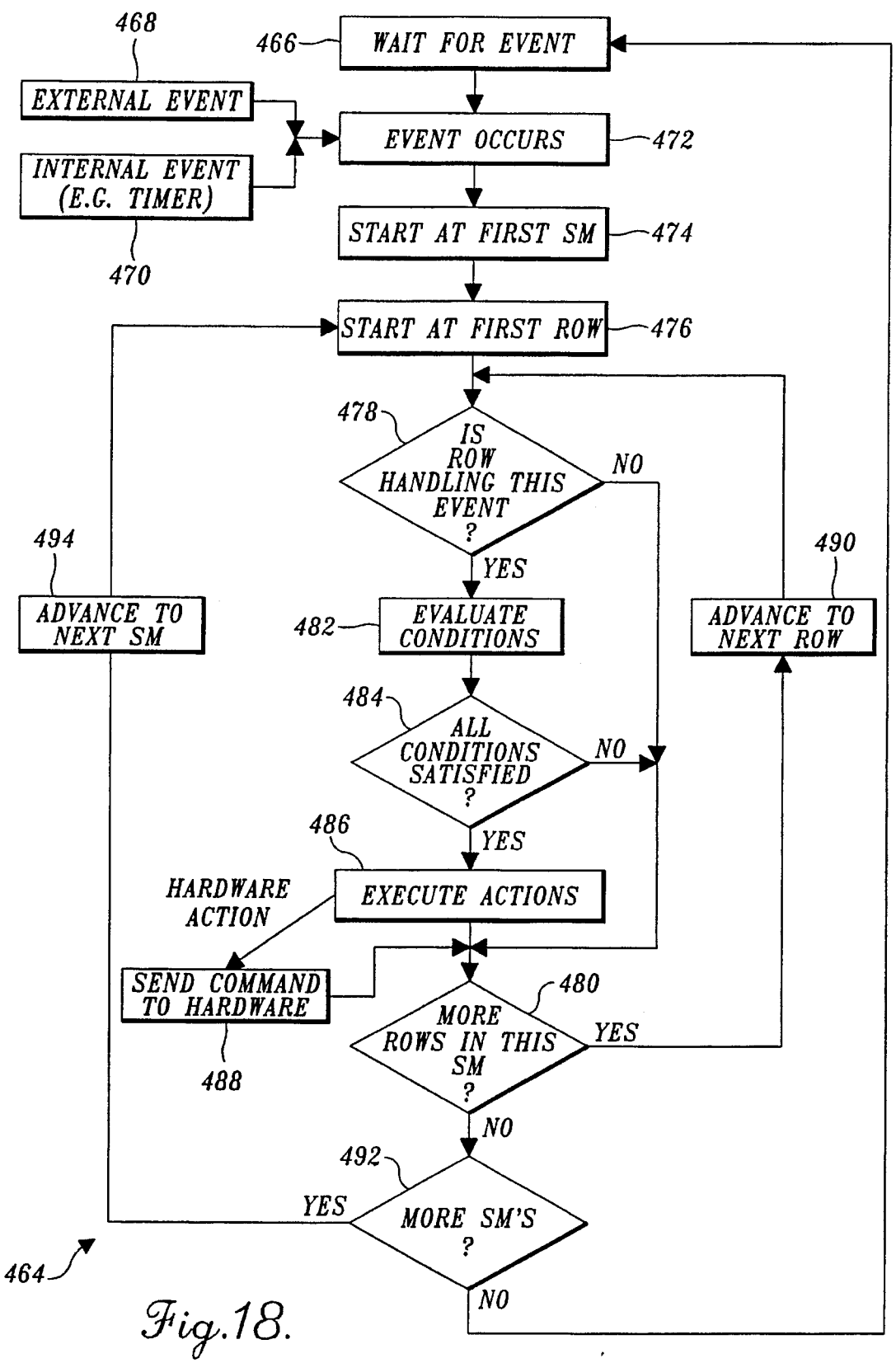
FIG. 18 is a flow chart of the logical step implemented during the internal operation of the schedule manager.

The logical steps implemented in handling events are shown in a flow chart 464 in FIG. 18. The occurrence of an event initiates an interrupt to which the software responds. Accordingly, a block 466 suggests that the logic is interrupt driven and simply waits for an event to occur. Such events may comprise an external event, as noted in a block 468, such as the arrival of a locomotive on a particular track section, or an internal event, as provided in a block 470. An example of an internal event would be a software timer completing its preset time interval. Once either of these two types of events occurs, as noted in a block 472, the schedule manager begins reviewing each of the schedule manager grids that are open and active, as indicated in a block 474. At times, only a single schedule manager grid may be active; however, more commonly, for complex systems, a plurality of schedule manager grids are active at any one time. Starting with the first row of the first schedule manager grid, as stated in a block 476, the schedule manager determines if that row is handling this event. In other words, if the event that has just occurred appears as a corresponding graphic icon in the first column of that row in the schedule manager grid, the row is handling the event as indicated in a decision block 478. If not, the logic proceeds to a decision block 480, which determines if any additional rows exist in the schedule manager grid and, if so, proceeds to a block 490. Block 490 provides for advancing to the next row. The logic thereafter returns to decision block 478. If no other rows exist in the schedule manager grid, a decision block 492 determines if there are any additional schedule manager grids to be checked in connection with the event that has just occurred. If not, the logic proceeds back to block 466 to wait for the next event. Otherwise, it advances to check the next schedule manager grid, as noted in a block 494, and then starts reviewing the first row in that schedule manager grid in accordance with block 476.

Once an event graphic icon is found in a row of the schedule manager grid being checked that matches the event that has just occurred (block 478), a block 482 provides for evaluating the conditions in that row (if any). A decision block 484 determines if all of the conditions are satisfied and, if not, proceeds to decision block 480 to check other rows in the schedule manager grid being reviewed. However, if all conditions are satisfied, the logic proceeds to a block 486, which executes each of the control actions appearing in the row for which a matching event and all satisfied conditions have been found. The result of executing the action typically involves a hardware action, such as advancing a train from one track section to another or changing an electromagnetic switch status. Therefore, a block 488 sends the appropriate command to implement the actions to be executed to the hardware via the control unit that is handling the device to be controlled. The logic then proceeds with decision block 480 to evaluate any other rows in which matching events and all satisfied conditions may exist. Once all rows in the schedule manager grid currently being reviewed are evaluated, the schedule manager checks the next active schedule manager grid to identify and respond to any other matching events in a similar fashion.

Returning to FIG. 15, the user may at any time decide to proceed to a block 418, which provides for deactivating the schedule manager. Subsequently, the logic terminates in a block 420. Once the user has deactivated the schedule manager, the user may then decide to again activate the schedule manager, as per block 414.

Figure 16:
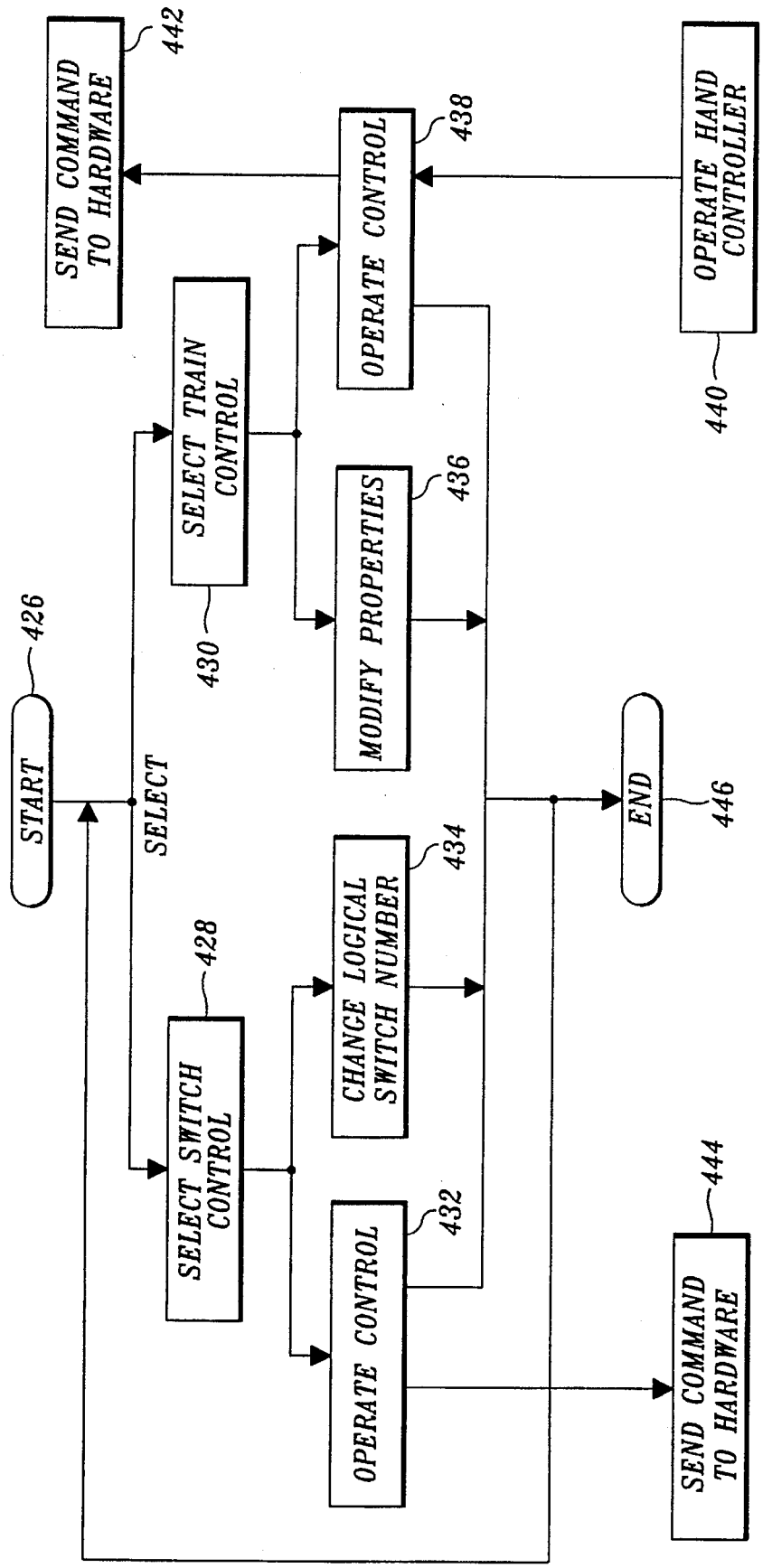
FIG. 16 is a flow chart that shows the logic employed in operating a control panel.

In FIG. 14, if the user elects to operate the control panel, in accordance with a block 402, the logic carries out steps that are illustrated in FIG. 16 in a flow chart 424. Beginning at a block 426, the logic offers the user the option of selectively controlling one of the electromagnetic switches, in accordance with a block 428, or of selectively controlling one of the trains, by providing the appropriate driving signals to a locomotive, as indicated in a block 430. If the user decides to operate one of the electromagnetic switches, he/she then has the option of operating a graphic control in a block 432, or changing a logical switch number associated with an actual hardware switch, as provided in a block 434.

If the user decides to operate one of the graphic switch controls on the control panel, any change made by the user results in a command being sent by computer 32 to the electromagnetic switch corresponding to the graphic control. This command is sent through the MCU or SCU that is coupled to control that electromagnetic switch, as indicated in a block 444 and causes the status of the electromagnetic switch to change.

Alternatively, if the user decides to control the speed of a train using the control panel, he/she can either elect to modify the properties of the graphic control for the train in connection with a block 436, or to operate one of the graphic speed controls on the control panel, as provided in a block 438. After completion of any selected option in blocks 432, 434, 436, or 438, the logic can proceed to an end block 446 or can provide for further selection of these options. Should the user choose to operate one of the graphic speed controls, any action taken, for example, moving the slider on the graphic control, results in a corresponding command being sent to the MCU or SCU that is coupled to the corresponding track sections on the route over which the train is running. This command causes the control unit to change the width of the drive pulses supplied to the specific track sections associated with the graphic control, which has the effect of changing the speed of the train that is on those track sections, as indicated in a block 442. It should also be noted that instead of operating a graphic control to achieve control over a train on a particular track section, the user can alternatively operate hand controller 152, selectively changing the throttle position, or direction of the train, or activating the brake button, as indicated in a block 440. In response to manual manipulation of the hand controller, any corresponding graphic control in the control panel visually changes and the appropriate command is sent to the switching network by computer 32.

Figure 17:
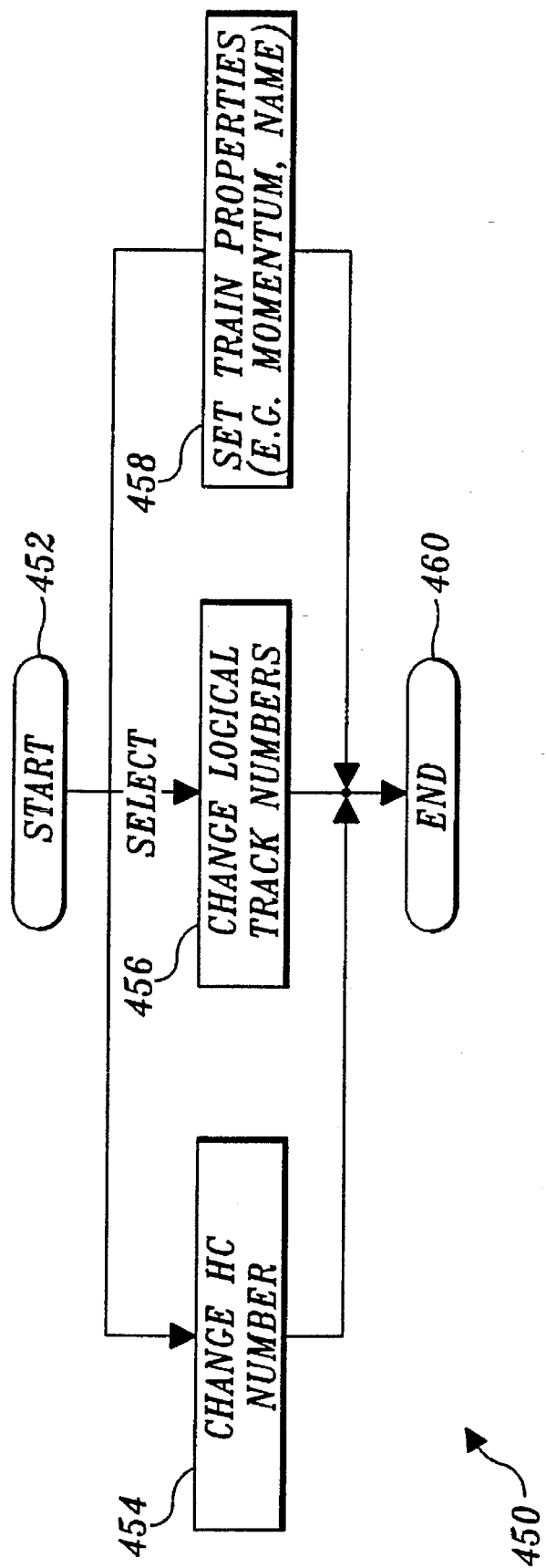
FIG. 17 is a flow chart illustrating the control steps among which a user can select in modifying the train control properties.

Block 436 enables the user to selectively modify properties of the control panel. The logical steps implemented in carrying out this selection appear in a flow chart 450 in FIG. 17. After a start block 452, the user is given the choice of changing the hand controller numbers associated with the graphic controls in the control panel in a block 454, or changing logical track section numbers with which the graphic controls in the control panel are associated in a block 456. Alternatively, the operator can, as indicated in a block 458, set properties of the train, such as its relative virtual mass (light, medium, or heavy), name or label, number of cars attached, etc. After any one of the possible choices represented by blocks 454, 456, or 458 are selected by the user, the logic proceeds to an end block 460. The logic then returns to the main flow chart shown in FIG. 14, giving the user the range of options already discussed for running and modifying the control system.

While the present invention has been disclosed in connection with controlling a plurality of locomotives running on a track layout, it will be appreciated that other applications of the invention can readily be implemented with only appropriate changes to the hardware and software. In fact, other types of toys, such as race cars running on a track can be controlled with virtually no change in the software and hardware elements disclosed above. It is also contemplated that the overall control scheme can be adapted for use in controlling any type of system in which devices are electrically actuated in response to events. Thus, the control scheme can be used in connection with controlling an entire house, for switching lights on and off at designated times, and for controlling security and fire detection, manipulating entertainment devices such as stereos and televisions, and generally controlling any device plugged into an electrical outlet. The control scheme of this invention is ideally suited to many types of business applications. For example, the control scheme could be used in making decisions concerning the buying and selling of stock (the control action), based upon events and conditions relating to stock prices, other parameters of the companies represented by the stock shares, and changes in stock indexes. Another application for which this control scheme is well suited is the control of theatrical lighting, special effects, and other actions that might need to be implemented during a stage presentation or concert. The graphic interface of the present invention enables the user to easily develop complex control schemes in which a variety of events, conditions, and actions are defined. Accordingly, the invention is seen to have utility far beyond the exemplary use in controlling toy vehicles running on a track discussed above.

While the present invention has been disclosed in connection with a preferred embodiment and modifications thereto, it is not intended that the scope of the invention in any way be limited by this disclosure. Instead, the scope should be determined entirely by reference to the claims that follow.

The embodiments of the invention in which an exclusive property or privilege is claimed are defined as follows:

1. A system for controlling toy vehicles running on a track, comprising:
   (a) a computer including a display, a central processing unit, an operator interface, a memory, and at least one port coupled to the central processing unit for input and output of electrical signals, said central processing unit responding to electrical signals input to the computer through said at least one port in accordance with a state machine that is graphically defined by a user with the operator interface, by producing control signals that are conveyed through said at least one port to control the toy vehicles;
   (b) a power supply producing electrical power suitable to energize the toy vehicles, said power supply being coupled to a switching network that is controlled by the central processing unit in accord with the state machine defined by the operator;
   (c) a track divided into a plurality of sections, each section being separately electrically coupled to the power supply through the switching network so that each section is independently energized by the switching network under control of the central processing unit;
   (d) a plurality of toy vehicle detection circuits, each associated with a different one of the plurality of sections of track to detect a toy vehicle that is disposed on said section of track; and
   (e) program instructions stored in the memory, said programmed instructions enabling the user to graphically define the state machine to control the plurality of toy vehicles on the track, said state machine graphically identifying for at least one of the toy vehicles an event selected by the user, and at least one control action selected by the user for association with the event, said event at times comprising an arrival of one of the toy vehicles on a selected section of track as detected by the toy vehicle detection circuit associated with that section of track, and said control action at times comprising the central processing unit producing a control signal through said at least one port that causes the switching network to energize a selected section of track when said event has occurred.

2. The system of claim 1, wherein the program instructions enable the user to graphically define at least one condition that is associated with the event, the central processing unit not producing the control signal to effect the control action associated with the event until said at least one condition is satisfied.

3. The system of claim 1, wherein the switching network comprises a master control unit that includes a plurality of motor control circuits, each motor control circuit enabling application of an electrical current produced by the power supply to a specific section of the track in order to energize one of the toy vehicles that arrives on that section of track.

4. The system of claim 3, wherein the track includes at least one electromagnetic switch that controls routing between sections of the track of a toy vehicle running over the electromagnetic switch, and wherein the master control unit selectively energizes the electromagnetic switch in response to control signals from the computer.

5. The system of claim 3, wherein the switching network comprises at least one slave control unit, said slave control unit including a plurality of motor control circuits, each motor control circuit enabling application of an electrical current produced by the power supply to a specific section of the track in order to energize one of the toy vehicles that arrives on that section of track.

6. The system of claim 5, wherein the master control unit and each slave control unit further comprise synchronization means for ensuring that the electrical current on one track section is in phase with that on adjacent track sections while a toy vehicle crosses a boundary between the adjacent track sections, to prevent inadvertent speed changes by the toy vehicle when it crosses the boundary.

7. The system of claim 1, wherein the track sections each comprise pairs of rails, the switching network includes means for applying a detector pulse to one rail of the pair of rails comprising a section of track, and the toy vehicle detection circuits respond to a presence of the detector pulse on the other rail of the pair of rails comprising the section of track, the detector pulse being present on said other rail as a result of electrical conduction of the detector pulse through the toy vehicle from the one rail to the other rail.

8. The system of claim 7, wherein the switching network periodically applies the detector pulse to the section of the track while the switching network is not enabling electrical current to drivingly energize the toy vehicle.

9. The system of claim 7, wherein the switching network provides a pulse width modulated electrical current to energize the toy vehicle and controls the speed of the toy vehicle by controlling the width of pulses comprising said electrical current in response to control signals from the computer.

10. The system of claim 2, wherein the program instructions enable the user to graphically define the state machine by:
   (a) selecting an event symbol from a plurality of predefined event symbols, each of which represents a different event that might occur;
   (b) selecting a condition symbol from a plurality of predefined condition symbols, each of which represents a different condition that must be satisfied; and
   (c) selecting an action symbol from a plurality of predefined action symbols, each of which represents a different control action that can be implemented.

11. The system of claim 10, wherein the program instructions further enable the user to graphically define the state machine by associating the event symbol selected with at least one condition symbol that was selected and at least one action symbol that was selected, to define one of a row and a column in a schedule manager grid comprising at least said one of the row and column, said schedule manager grid to be used for controlling at least one of the toy vehicles.

12. The system of claim 11, wherein in response to an event represented by the event symbol selected by the operator occurring and a condition represented by the condition symbol selected by the operator being met, the program instructions cause the control action represented by the action symbol to be implemented.

13. The system of claim 12, wherein the plurality of condition symbols include a symbol indicating whether a specific toy vehicle owns a section of track, the specific toy vehicle owning the section of track if said specific toy vehicle can control that section of track without interference from other toy vehicles, thereby ensuring that only one toy vehicle occupies said section of track at one time.

14. The system of claim 12, wherein the central processing unit includes a timer, and wherein the plurality of event symbols include an event symbol that responds to expiration of a time interval on the timer.

15. The system of claim 1, wherein the switching network produces frequency modulated alternating current signals that are supplied to the track sections in response to control signals from the computer, said frequency modulated alternating current signals conveying commands defined by changes in frequency to the toy vehicles running on the plurality of track sections to indicate a desired speed and direction of the toy vehicles.

16. The system of claim 15, wherein the frequency modulated alternating current is supplied only to selected track sections by the switching network in response to control signals produced by the computer.

17. The system of claim 15, wherein the switching network produces detector pulses that are periodically interspersed with the frequency modulated alternating current signals, said toy vehicle detection circuits responding to a conductance of the detector pulses through the toy vehicles to determine if one of the toy vehicles is present on a specific track section.

* * * * *